July 21, 1959
J. W. HOLDEMAN ET AL
2,895,344
TRANSMISSION
Filed Nov. 13, 1953
12 Sheets-Sheet 2
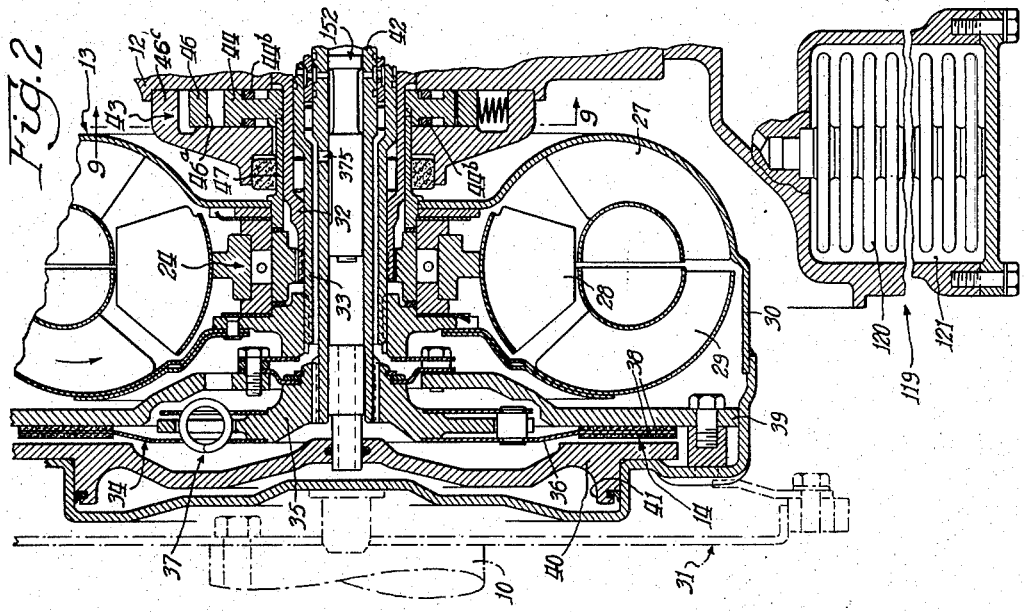
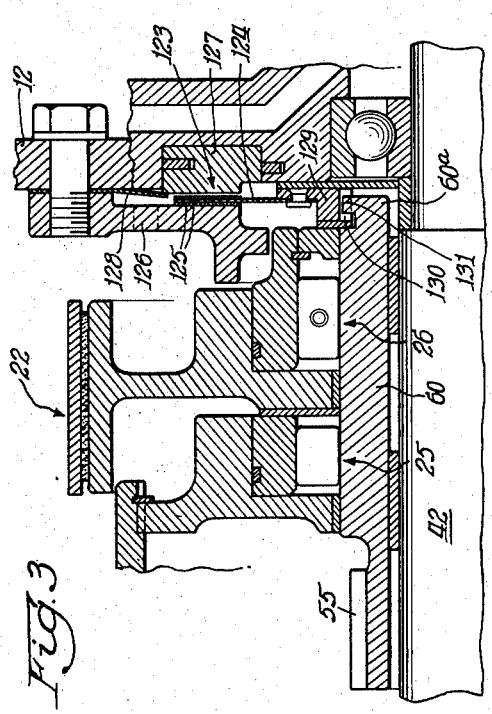
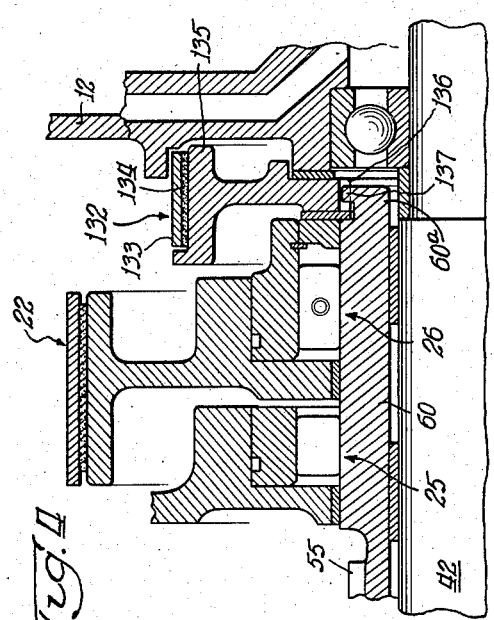
Inventors:
Vincent E. Masko,
John W. Holdeman,
Gordon E. Whelpley.
By: and John B. Polomski.
Keith J. Blene Atty.

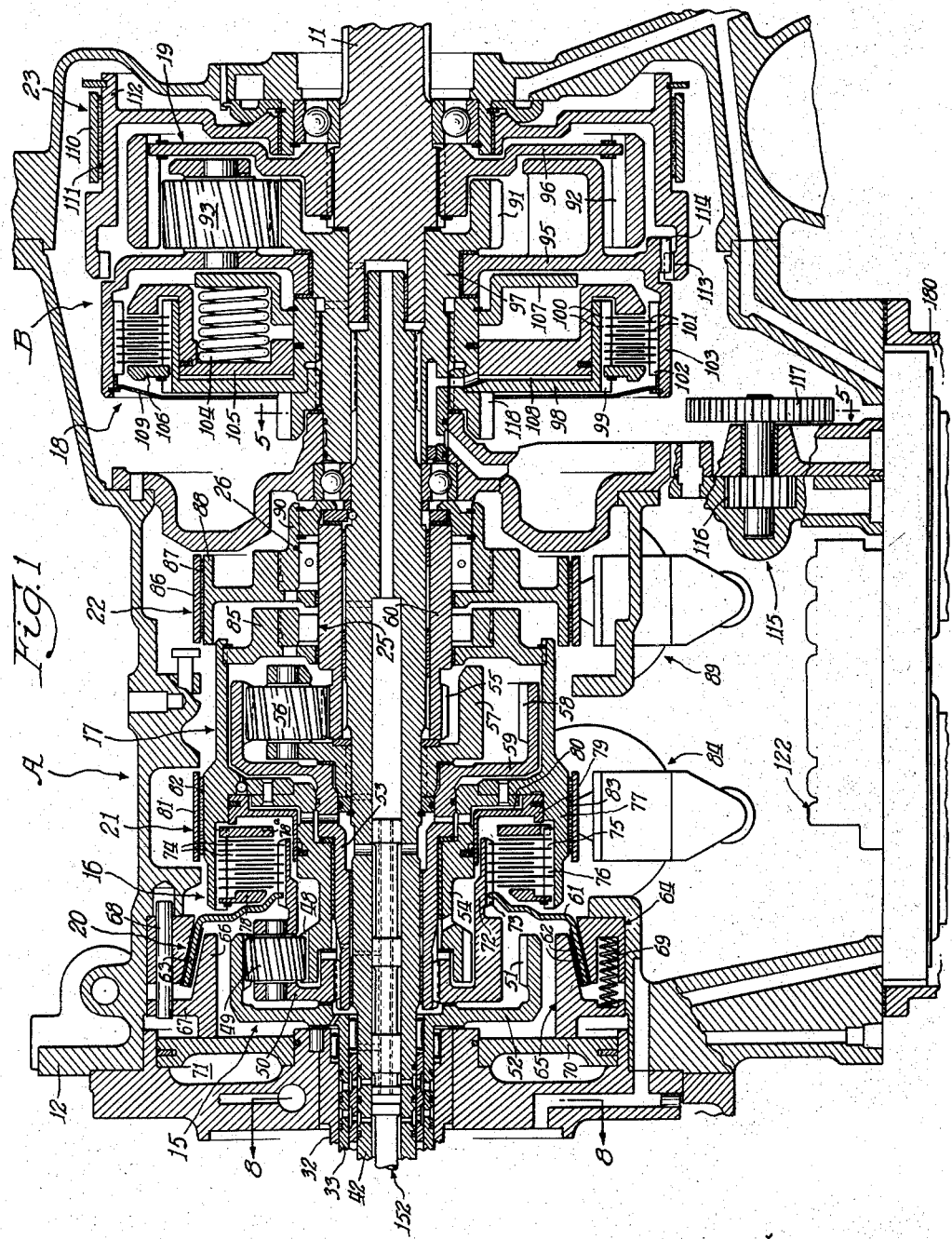

July 21, 1959  J. W. HOLDEMAN ET AL  2,895,344

TRANSMISSION

Filed Nov. 13, 1953  12 Sheets-Sheet 3

Inventors:
Vincent E. Masko,
John W. Holdeman,
Gordon E. Whelpley
and John B. Polomski.
By Keith T. Bleuer Atty

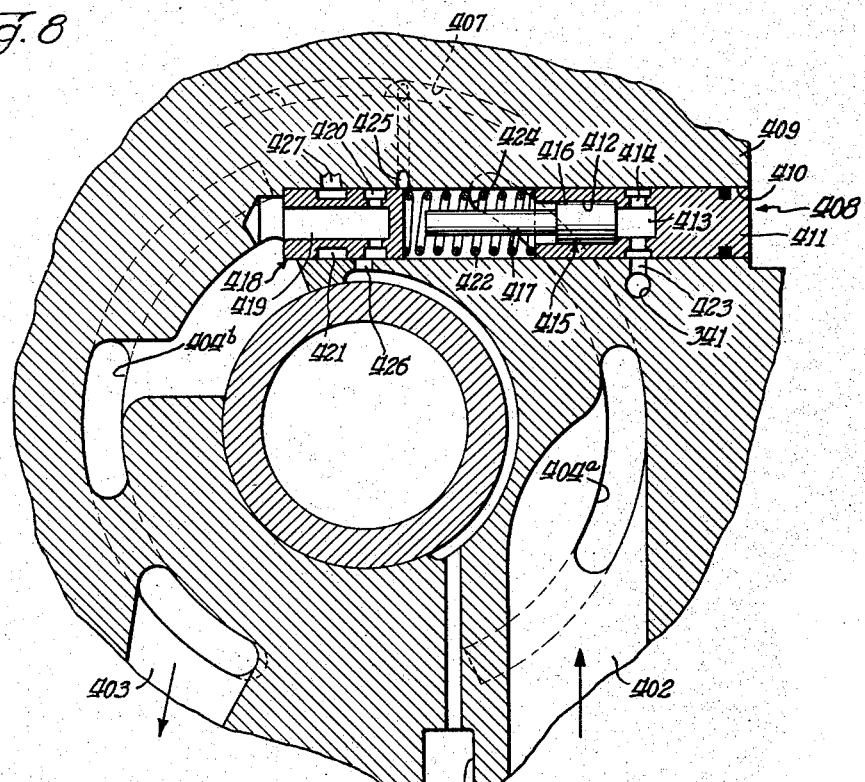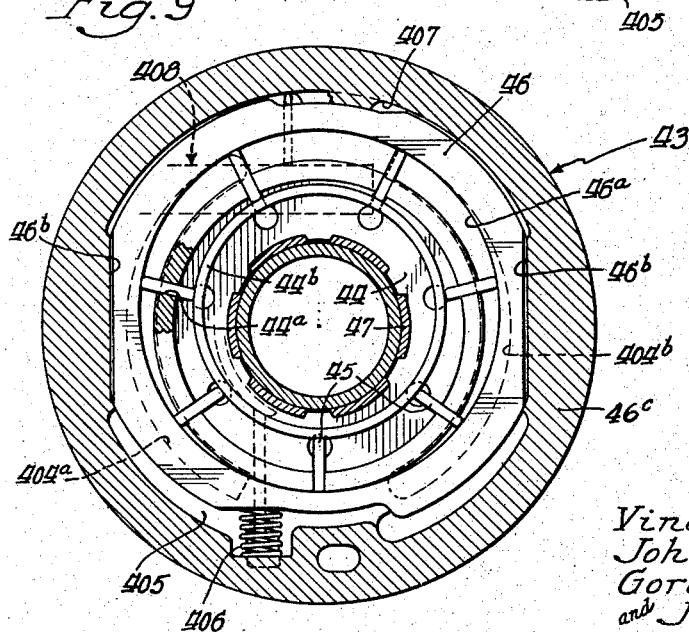

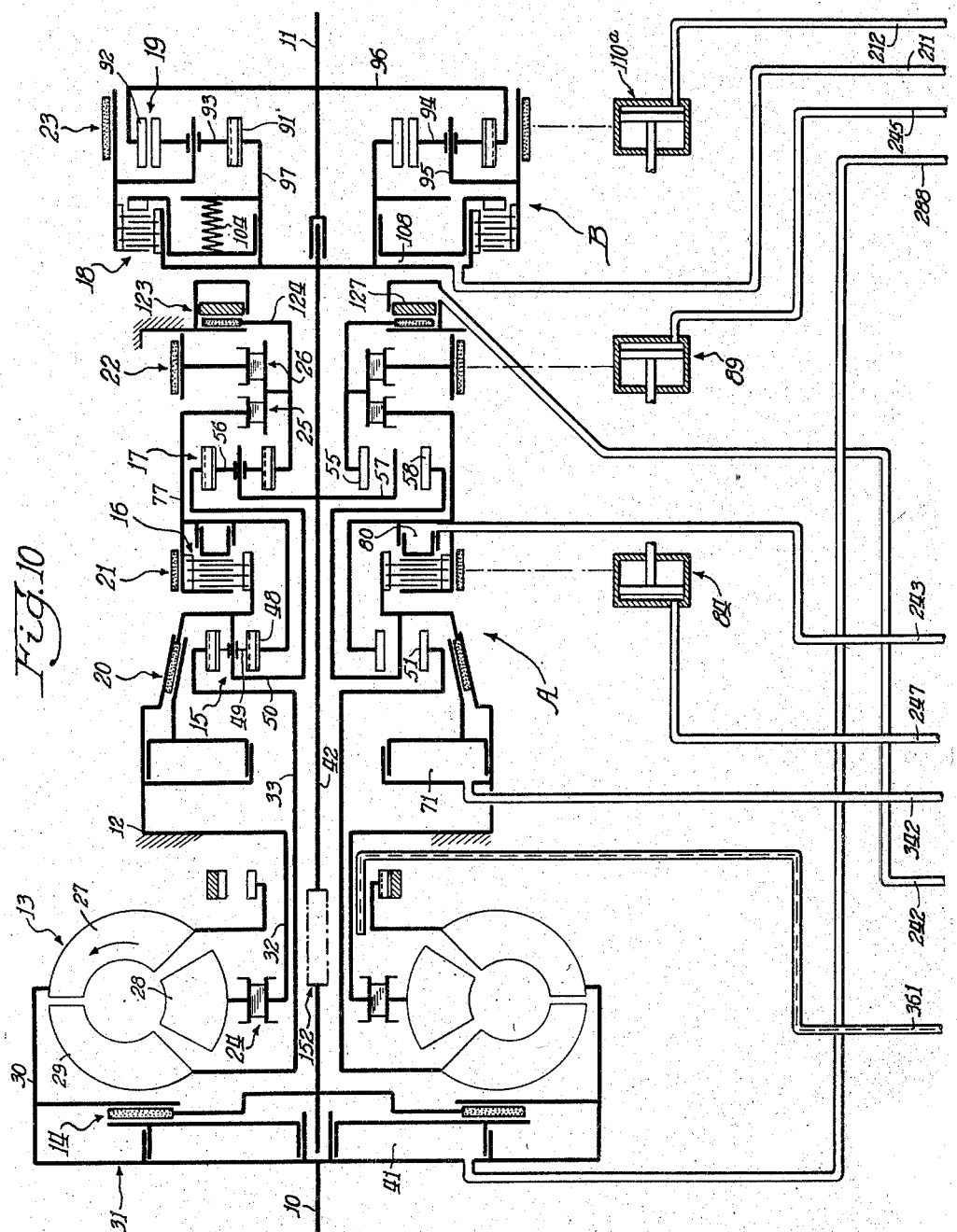

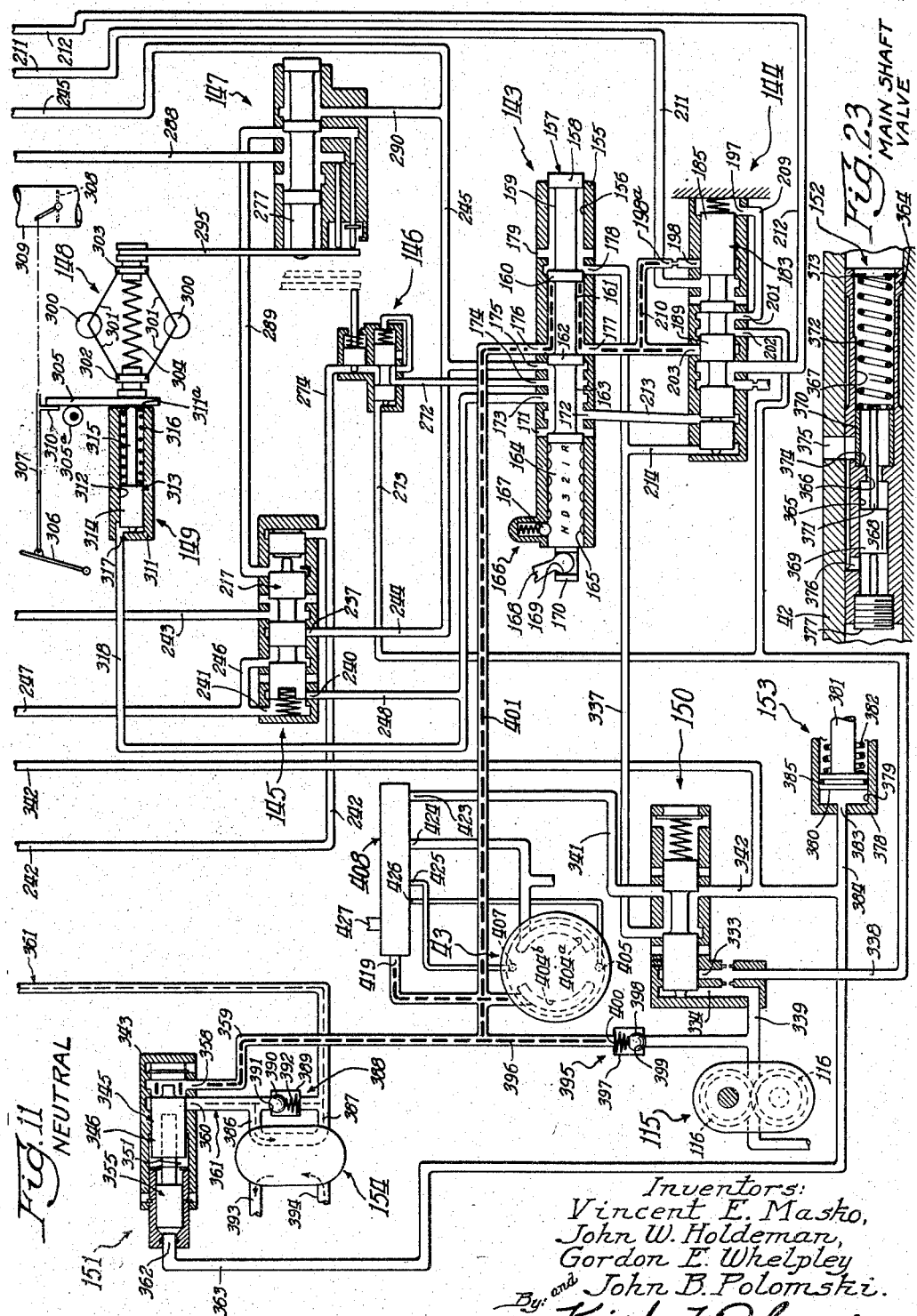

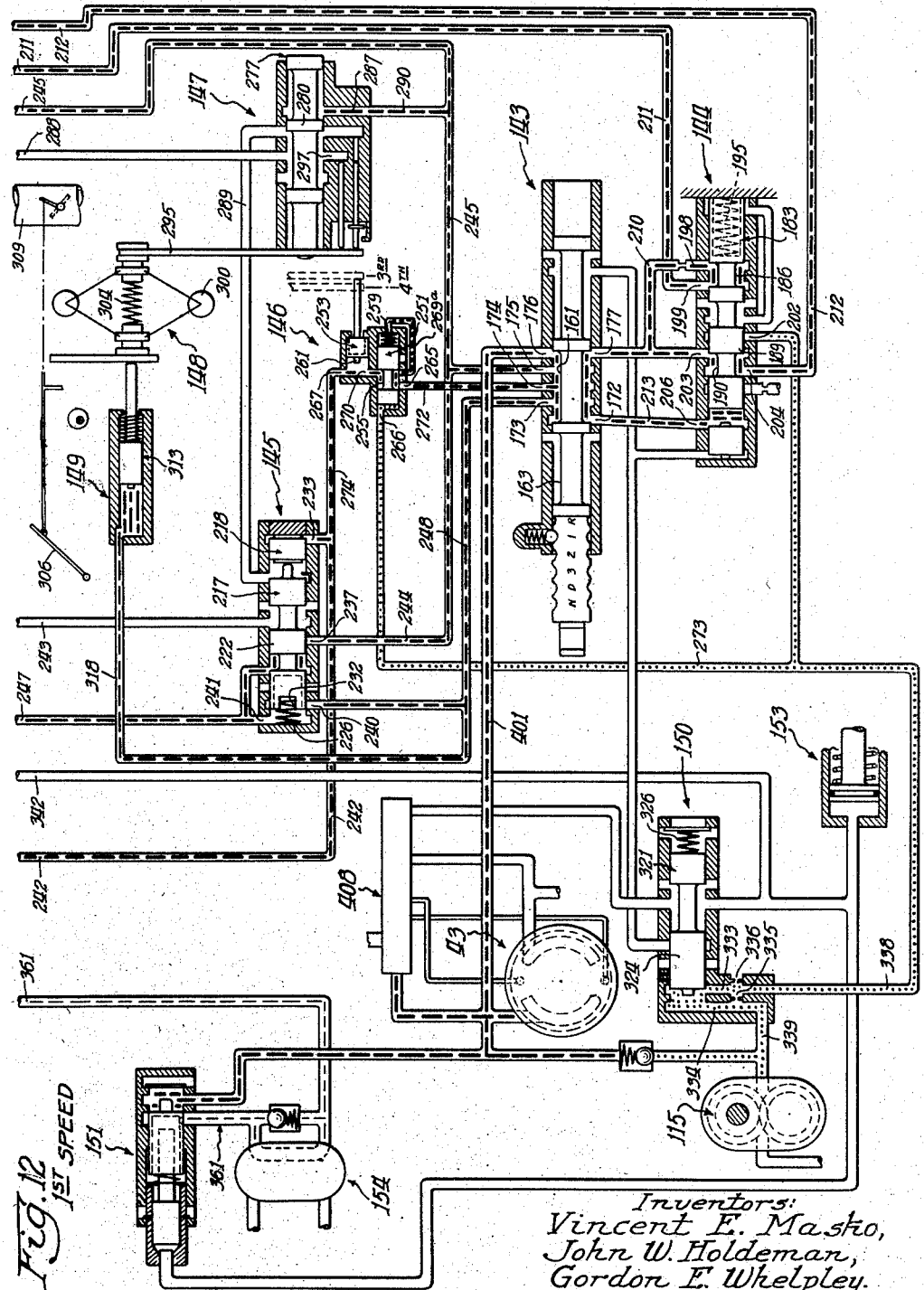

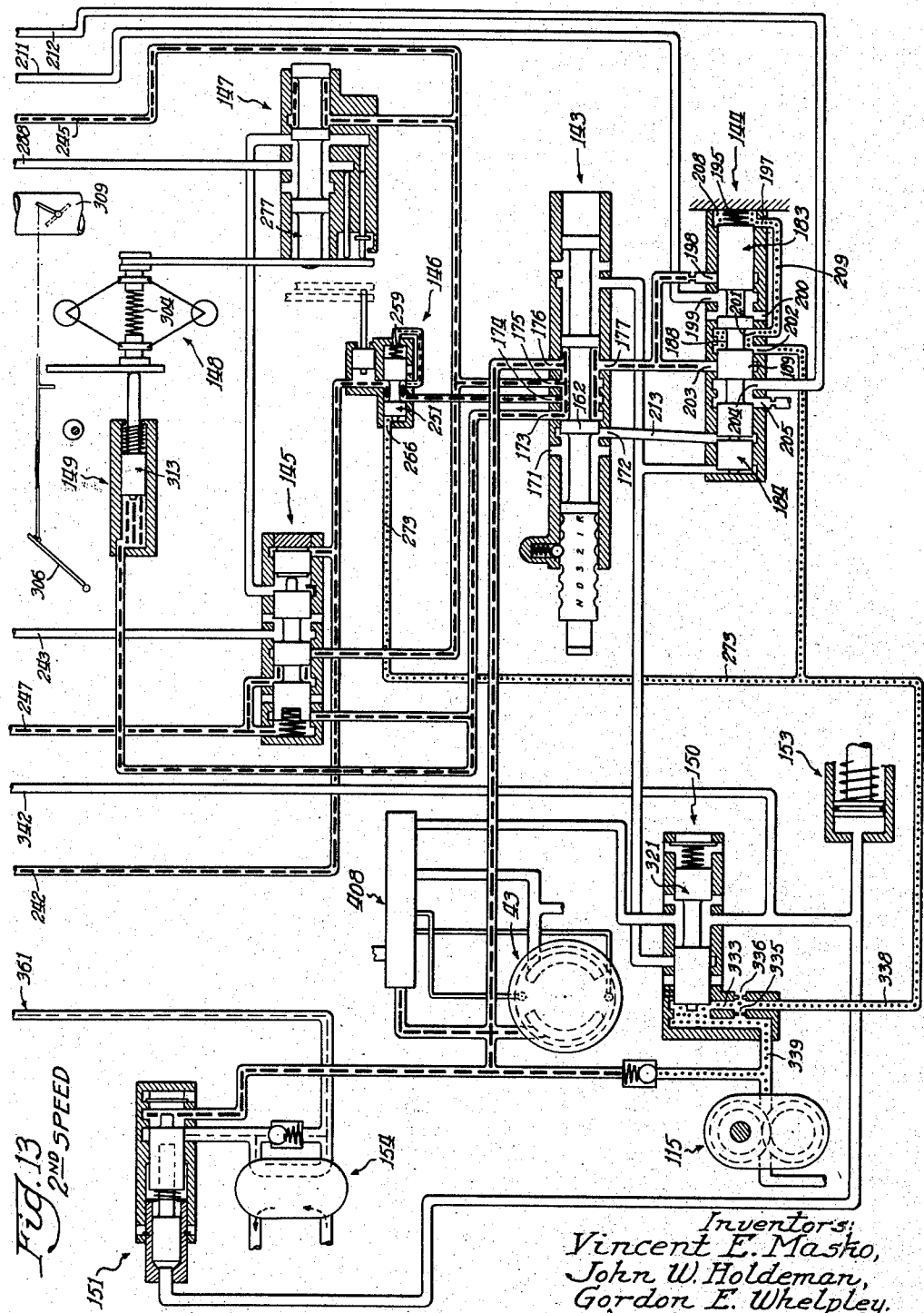

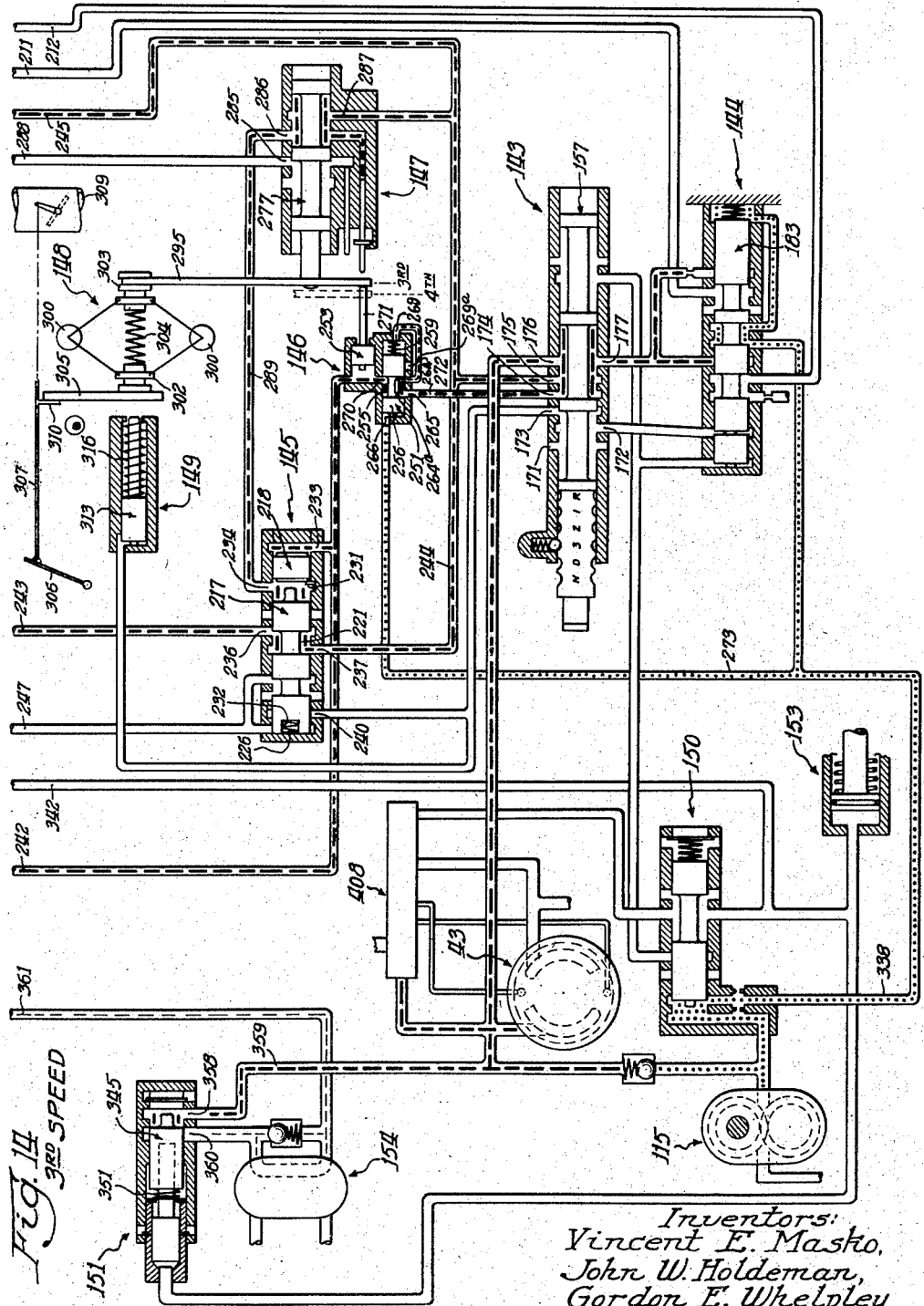

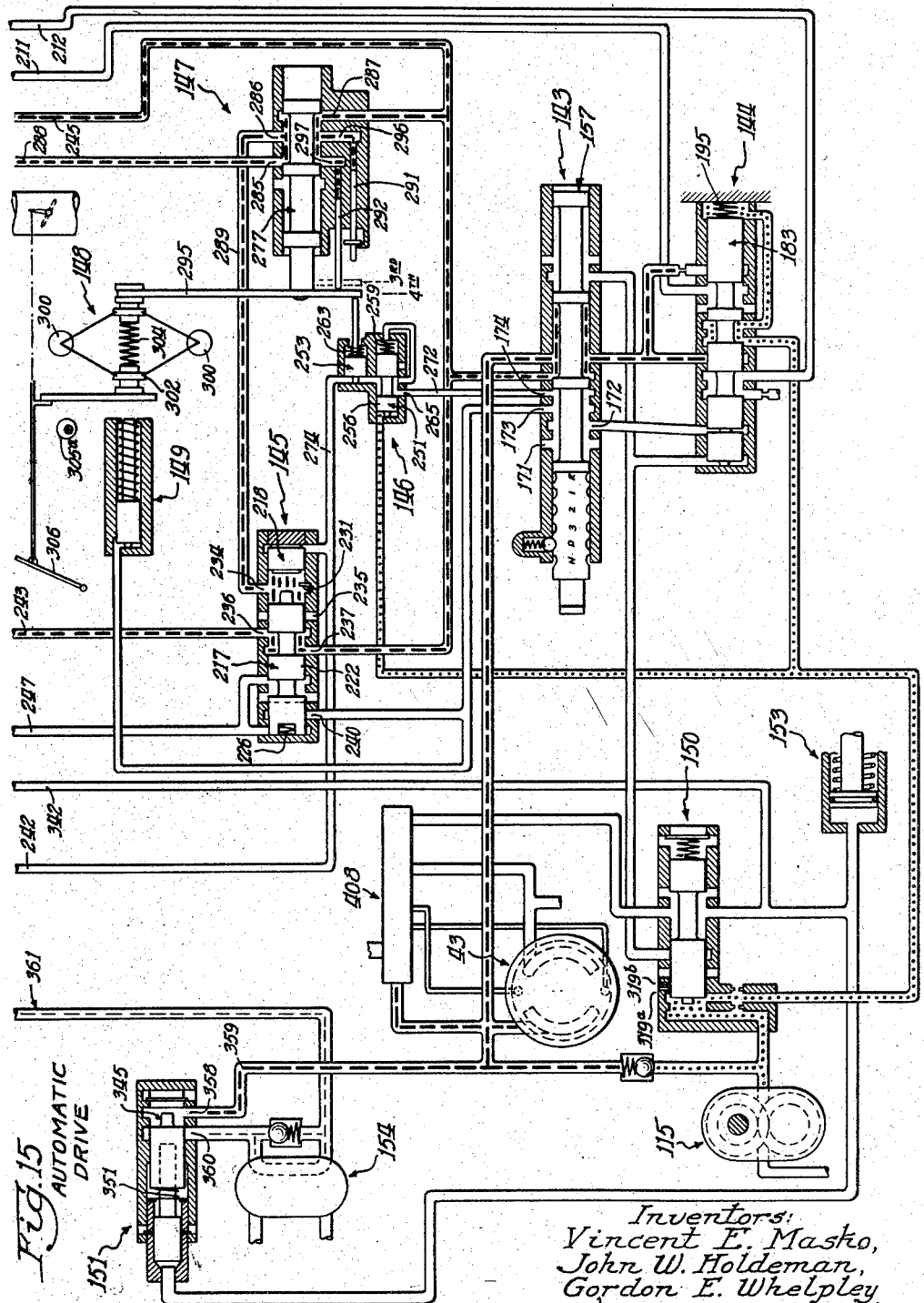

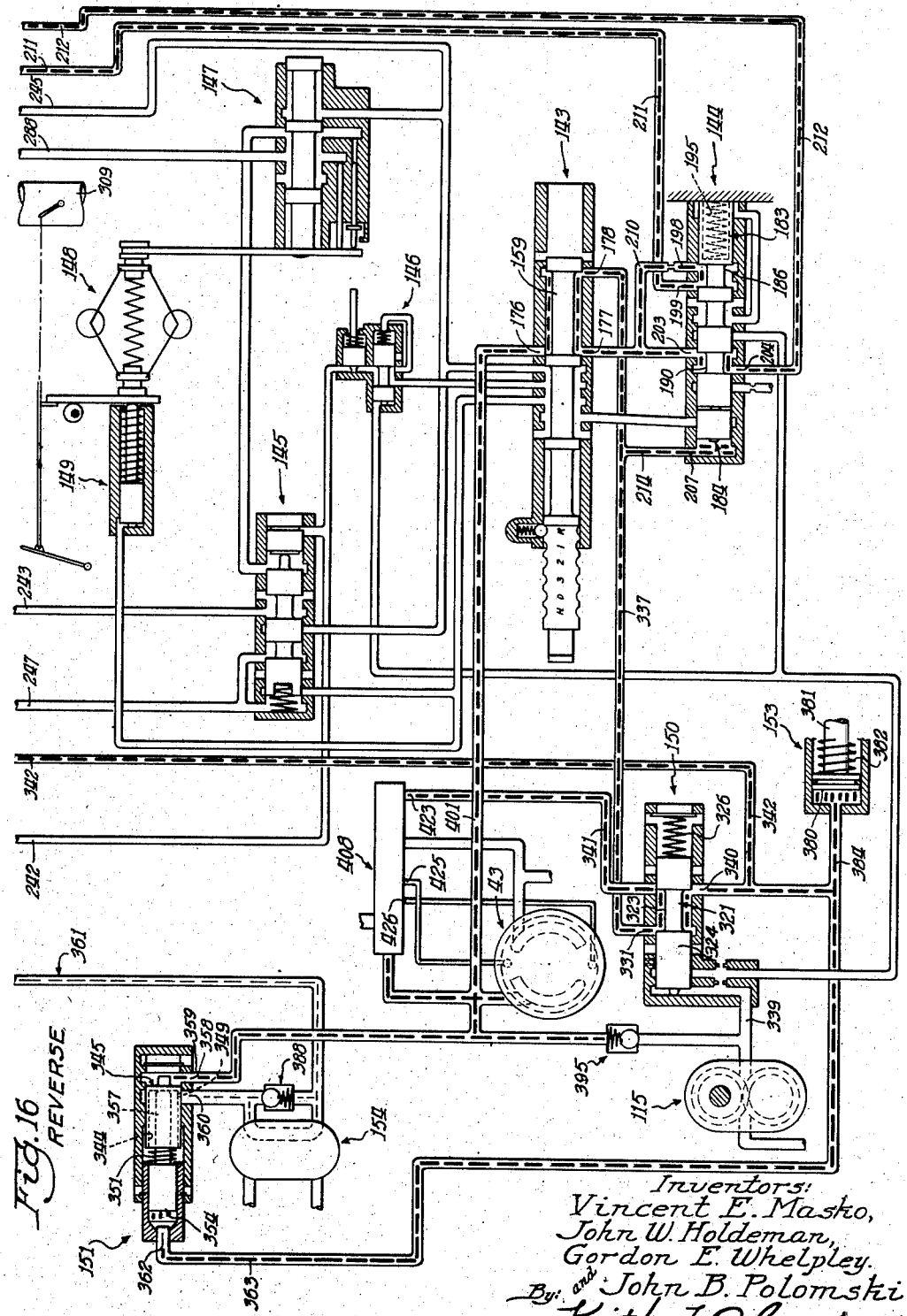

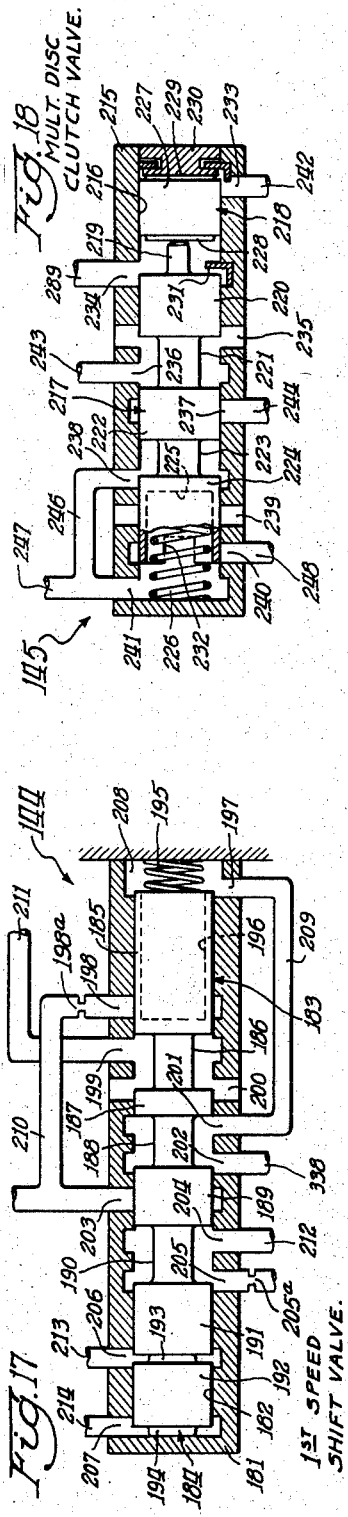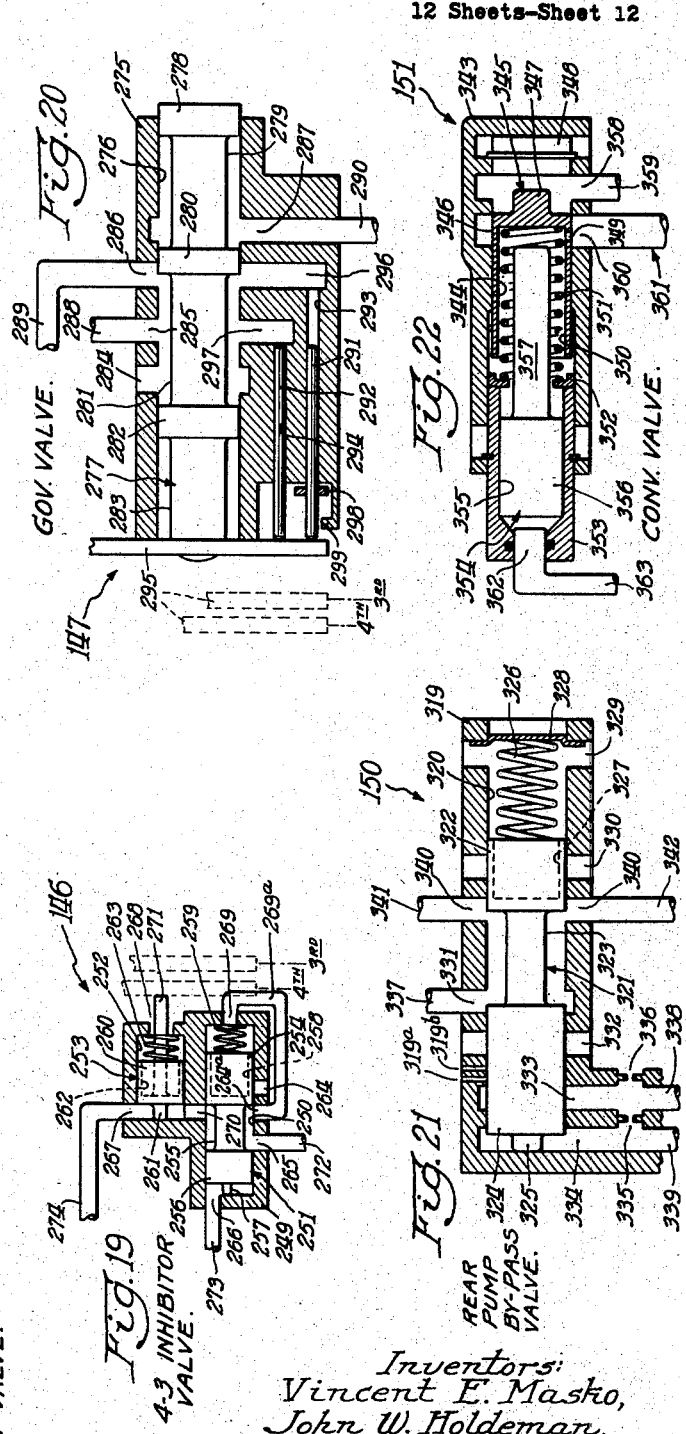

United States Patent Office 2,895,344
Patented July 21, 1959

2,895,344

TRANSMISSION

John W. Holdeman, Vincent E. Masko, John B. Polomski, and Gordon E. Whelpley, Detroit, Mich., assignors to Borg-Warner Corporation, Chicago, Ill., a corporation of Illinois Application November 13, 1953, Serial No. 391,878

9 Claims. (Cl. 74—472)

This invention relates to power transmissions and more particularly to four forward speed and a reverse drive transmission for an automotive vehicle, together with controls for automatically producing ratio changes in the transmission.

It is an object of the present invention to provide an improved control system for a multiple forward speed transmission which causes ratio changing automatically and which, in addition, includes means for manually selecting any of the drives below the highest speed drive and for maintaining the transmission in this drive.

It is another object of the invention to provide an improved transmission control system of this type which automatically changes the ratio of the transmission between its three higher speed drives in response to changes in vehicle speed and the demand for torque by the vehicle driver. It is contemplated that the lowest speed forward drive shall be selectable at the driver's option and that no automatic ratio changing may preferably include this lowest speed drive.

The transmission control arrangement preferably includes a flyball governor actuated valve for causing an upshifting of the transmission, and it is an object of the invention to provide a selectively fluid pressure actuated piston in connection with the flyball governor which maintains the governor and the valve actuated thereby in a downshifted condition so that the governor may not function to upshift the transmission. The transmission control arrangement also preferably includes a valve responsive to a pressure applied by a driven shaft pump which pressure increases in accordance with vehicle speed for maintaining the valve in a position which cuts off pressure fluid to the piston and does not allow a downshift above a predetermined speed of the vehicle.

A transfer case assembly may be connected in tandem with the transmission per se for driving the front wheels of the vehicle in forward and reverse through one-way clutches, and it is an object of the present invention to provide, in the control arrangement, means for automatically engaging the forward drive one-way clutch when the transmission is conditioned for forward drive and for engaging the reverse drive one-way clutch when the transmission is conditioned for reverse drive.

It is an object of the invention to provide a variable displacement pump for supplying fluid pressure for engaging the various friction clutches and brakes of the transmission and which is controlled by a valve subject to the output pressure of the pump. It is also an object to provide another valve subject to the output pressure of an second pump that is driven in accordance with movement of the vehicle for connecting the first valve with a pressure line from the variable displacement pump for applying an increased pressure on the first valve so as to raise the output pressure of the variable displacement pump when the second pump rotates in the reverse direction for the reverse drive and for preventing such connection between the first valve and pressure line, as well as for preventing engagement of a reverse drive completing friction brake, as long as the vehicle is moving in the forward direction.

It is another object of the invention to provide a valve supplied with the fluid pressure in the system used on the friction bands and clutches and which supplies a reduced fluid pressure to a hydraulic torque converter in the transmission, and it is an object to provide means for applying a pressure on the valve for reverse drive so that the pressure in the torque converter is maintained at the same predetermined reduced value as for forward drives regardless of said increased pressure for reverse drive.

The invention consists of the novel constructions, arrangements, and devices to be hereinafter described and claimed for carrying out the above stated objects and such other objects as will be apparent from the following description of preferred forms of the invention, illustrated with reference to the accompanying drawings, wherein:

Fig. 1 is a fragmentary longitudinal sectional view of the gearing portion of a first embodiment of the transmission mechanism of the present invention;

Fig. 2 is a fragmentary longitudinal sectional view of the torque converter portion of any one of the embodiments of this invention;

Fig. 3 is an enlarged fragmentary sectional view of the sun gear brake portion of a second embodiment of the transmission mechanism of this invention;

Fig. 4 is a fragmentary sectional view of a revised brake construction for the embodiment of Fig. 3;

Fig. 5 is a sectional view taken on line 5—5 of Fig. 1;

Fig. 6 is an elevational view of parts of the transmission shown in Fig. 5;

Fig. 7 is a diagrammatic illustration of a transfer case assembly for driving the front wheels of the vehicle as well as the rear wheels, which may be attached to the transmission as illustrated in Figs. 1 to 6;

Fig. 8 is a sectional view on an enlarged scale taken on line 8—8 of Fig. 1;

Fig. 9 is a sectional view on an enlarged scale taken on line 9—9 of Fig. 2;

Fig. 10 is a diagrammatic illustration of the transmission of the present invention including the sun gear brake embodiment of Fig. 3;

Fig. 11 is a schematic diagram of a control system for the transmission as shown in Fig. 10, showing the control system in neutral condition;

Fig. 12 is a schematic diagram of the control system, with the system being in the first speed forward condition;

Fig. 13 is a schematic diagram of the control system, with the system being in the second speed forward condition;

Fig. 14 is a schematic diagram of the control system, with the system being in the third speed forward condition;

Fig. 15 is a schematic diagram of the control system, with the system being conditioned for automatic forward drive and with the system being in fourth speed forward condition;

Fig. 16 is a schematic diagram of the control system, with the system being in the reverse drive condition;

Fig. 17 is an enlarged diagrammatic, partly sectional, view of the first speed shift valve of Figs. 11 to 16;

Fig. 18 is an enlarged diagrammatic, partly sectional, view of the multiple disk clutch valve of Figs. 11 to 16;

Fig. 19 is an enlarged diagrammatic, partly sectional, view of the 4—3 inhibitor valve of Figs. 11 to 16;

Fig. 20 is an enlarged diagrammatic, partly sectional, view of the governor valve of Figs. 11 to 16;

Fig. 21 is an enlarged diagrammatic, partly sectional, view of the rear pump by-pass valve of Figs. 11 to 16;

Fig. 22 is an enlarged diagrammatic, partly sectional, view of the torque converter valve of Figs. 11 to 16; and Fig. 23 is an enlarged fragmentary sectional view of the main shaft valve of Figs. 1, 2 and 10.

Like characters of reference designate like parts in the several views.

Description of the transmission mechanism

The transmission shown in Figs. 1 and 2 comprises, generally, a drive shaft 10, driven from a source of power such as an internal combustion engine in a vehicle (not shown), and a driven shaft 11, which is connected to the drive wheels of the vehicle (not shown) through suitable means (not shown). The driving torque from the drive shaft 10 is transmitted to the driven shaft 11 through transmisison mechanism contained in a stationary casing 12 and including generally a hydraulic torque converter 13, a direct drive friction clutch 14, a first planetary gear set 15, a multiple disk-type clutch 16, a second planetary gear set 17, a second multiple disk clutch 18 and a third planetary gear set 19. For providing reactions in the gear sets to complete the various drive ratios, a cone friction brake 20, a first band-type friction brake 21, a second band-type friction brake 22 and a third band-type friction brake 23 are incorporated in the transmission. In addition to the friction-type reaction providing means and the friction engaging means in the transmission, a plurality of one-way engaging devices are provided for locking together various elements. These one-way engaging devices include a one-way brake 24 for providing a reaction in the hydraulic torque converter 13 and one-way engaging devices 25 and 26 for providing reactions or one-way conections in the gear sets. The gear sets 15 and 17, the brakes 20, 21 and 22, and the one-way engaging devices 25 and 26 comprise a forward transmission unit designated by the reference letter A, while the gear set 19, the friction clutch 18, and the friction brake 23 provide a rear transmission unit designated by the reference letter B.

The hydraulic torque converter 13 includes an annular vaned or bladed impeller member 27, an annular vaned or bladed stator or reactor member 28 and an annular vaned or bladed turbine ro rotor member 29. The impeller 27 is connected to an outer torque converter casing or housing 30 which is connected to a fly-wheel assembly 31. The fly-wheel assembly 31 is connected, in turn, to the drive shaft 10 so that the impeller 27 of the torque converter is driven directly by the transmission drive shaft. The stator 28 is mounted on a stationary sleeve portion 32 which is connected to the stationary casing 12 of the transmission.

The one-way brake 24 is positioned between the stator 28 and the stationary sleeve 32 and is adapted to allow free rotation of the stator in the forward direction, that is, in the same direction the drive shaft 10 is driven, but is adapted to lock and prevent reverse rotation of the stator, that is, rotation in the direction opposite to that of the drive shaft 10, when the force on the stator tends to rotate the same in the reverse direction. The one-way brake 24 may be of any suitable construction, such as the sprag type, as shown.

The rotor 29 is splined to a sleeve or quill shaft 33 and is adapted for imparting rotary motion to the sleeve shaft.

The torque converter casing 30 is substantially filled with a fluid medium such as lubrication oil, so that rotary motion of the impeller 27 causes circulation of fluid within the casing in the direction shown by the arrow, and the energy of the fluid is imparted from the impeller 27 to the rotor 29 to rotate the rotor in the same direction as the impeller. At the initiation of rotation of the impeller 27 and as long as a substantial differential in speed between the impeller 27 and the rotor 29 exists, the fluid passing from the rotor to the stator 28 tends to rotate the stator in the reverse direction, which rotation is prevented by the one-way brake 24, and the vanes of the stator turn the fluid to impinge it on the vanes of the impeller to increase the torque transmitted through the converter. As the speed of the rotor 29 approaches that of the impeller 27, the fluid force on the stator 28 reverses in direction and the stator freewheels along with the impeller and the rotor. At this point, the torque converter begins to function as an ordinary two element fluid coupling. Since the torque converter construction and its operation are old in the art, it is not believed necessary to elaborate further.

The direct drive friction clutch 14 comprises a clutch disk assembly 34 having an inner portion 35 connected to an outer portion 36 by means of dampener springs 37. Annular clutch facings 38 are secured to the outer portion of the clutch and are adapted to be clamped between a pressure plate 39 fixedly secured to the fly-wheel assembly 31 and an axially movable piston member 40 when fluid under pressure is admitted to an annular clutch apply chamber 41 provided between the piston 40 and an opposing portion of the fly-wheel assembly 31. The hub portion 35 of the clutch assembly 14 is splined to an intermediate shaft 42 which extends through the center of the torque converter 13, through the sleeve shaft 33, and through the centers of the gear sets 15 and 17. Thus, when fluid under pressure is admitted into the clutch apply chamber 41 to engage the friction clutch 14, the intermediate shaft 42 is coupled to drive shaft 10 for a direct drive therefrom.

A front drive shaft driven fluid pump 43 is provided for supplying pressure to the transmission control system which will hereinafter be described. The pump 43 comprises an inner rotor 44 carrying radial vanes 45 slidably disposed in radial slots 44a in the periphery of the rotor. The rotor is disposed within an annular member 46 having an inner cylindrical surface 46a. A pair of rings 44b contact the inner ends of the vanes 45 and hold the vanes in contact with the surface 46a. The outer pump part 46 is slidably and reciprocably mounted in ways 46b provided in a stationary pump casing part 46c. The rotor 44 is driven through a sleeve 47 which is secured at one end to the inner annular portion of the impeller member 27 so that the pump rotor is driven directly by the drive shaft 10.

The first planetary gear set 15 includes a sun gear 48 which meshes with a plurality of planetary gears 49 rotatably mounted on a carrier 50 and which planetary gears mesh, in turn, with an internally toothed ring gear 51. The ring gear 51 is fixedly secured to the sleeve shaft 33 by means of an annular flange portion 52 which is formed integral with the sleeve shaft and the ring gear, so that the ring gear 51 is the drive member of the gear set and obtains its driving force from the rotor member 29 of the fluid torque converter 13. The carrier 50 is splined to a sleeve shaft 53 which is journalled about the intermediate shaft 42. The sun gear 48 is provided with a hub portion 54 which is journalled about the sleeve shaft 53.

The second planetary gear set 17 includes a sun gear 55, a plurality of planet gears 56 meshing with the sun gear and rotatably carried by a carrier 57, and an internally toothed ring gear 58 which also meshes with the planet gears 56. The ring gear 58 is fixedly secured to the sleeve shaft 53 by means of an annular flange 59 integral with the sleeve shaft and the ring gear, so that the ring gear 58 of the gear set 17 is secured to the carrier 50 of the gear set 15. The carrier 57 is splined to the intermediate shaft 42. The sun gear 55 is provided with an axially extending sleeve portion 60 which is journalled about the intermediate shaft 42.

The cone brake 20 comprises an annular brake member 61 which is provided with a pair of friction brake facings 62, one of which is secured on each side of an outer annular conically formed edge portion 63. The conical portion 63 and the facings 62 are adapted for being clamped between an annular backing member 64 secured to the casing 12 and an axially movable brake engagement member 65. The movable brake member 65 includes a frusto conical portion 66 adapted to engage the inner brake facing 62 and an integral flange portion 67 which is restrained from rotary movement by means of stationary guide pins 68. Compression springs 69 are disposed between the backing member 64 and the movable member 65 to urge the brake 20 to a disengaged position. An annular piston 70 abuts the forward edge of the movable member 65 and is adapted to move the member into clamping engagement with the brake member 61 when fluid under pressure is admitted to a brake apply chamber 71 formed between the piston 70 and a stationary portion of the transmission. The inner annular portion of the brake member 61 is splined to a hub portion 72 of the carrier 50 by means of splines 73 formed on the hub member 72. It is readily apparent that admission of pressure to the brake chamber 71 will engage the friction cone brake 20 to hold the carrier 50 against rotation to provide a reaction in the planetary gear set 15.

The multiple disk friction clutch 16 comprises a plurality of friction disks 74 splined on the hub member 72 of the carrier 50 by means of the splines 73. Interleaved between the friction discs 74 and disposed outwardly thereof are a plurality of clutch disks 75 which are splined to internal splines 76 formed within the forward end portion of a drum member 77. The drum member 77 is fixedly secured to the hub portion 54 of the sun gear 48. Engagement of the clutch 16 is accomplished by clamping the disks 74 and 75 between a backing plate 78 secured to the internal splines 76 of the drum 77 and an axially movable pressure plate 78a slidably splined on the splines 76. An annular axially movable piston 79 is slidably disposed in a cavity 80 formed within the drum 77 and sun gear hub 54 connected to the drum, and the piston is adapted to engage the pressure plate 78a on fluid under pressure being admitted to the chamber 80 to engage the clutch 16. It will be seen that engagement of the clutch 16 secures the carrier 50 to the sun gear 48 to lock up the gear set 15 to provide direct drive therethrough.

The friction brake 21 comprises a brake band 81 having an internal friction facing 82 secured thereto with the facing 82 adapted for engaging an external cylindrical portion 83 of the drum 77 to hold the drum stationary. Contraction of the brake band 81 to provide engagement of the brake 21 is accomplished by admitting fluid under pressure to a fluid actuated servo generally designated as 84, constructed and arranged in any suitable manner.

The one-way engaging device 25 is disposed between an annular member 85 secured to the drum 77 and the hub portion 60 of the sun gear 55 of the gear set 17. The one-way device 25 may be of any suitable construction, such as the tiltable sprag type as shown, and is adapted to lock to prevent rotation of the sun gear 48 connected with the drum 77 in the backward direction (opposite to the direction of rotation of the shaft 10) when the sun gear 55 is stationary.

The friction brake 22 comprises a brake band 86 having an annular friction facing 87 secured within the band and adapted to engage a brake drum 88. Contraction of the band 86 and engagement of the brake 22 is accomplished by admission of pressure fluid to fluid actuated servo 89 which is of any suitable construction.

The one-way engaging device 26 is provided between a member 90 secured within the brake drum 88 and a portion of the hub 60 of the sun gear 55. The one-way device 26 may be of any suitable construction such as the tiltable sprag type as shown and is adapted to prevent reverse rotation of the sun gear 55 when the brake 22 is engaged. Forward movement of the sun gear 55 relative to the brake drum 88 is permitted through overrunning of the engaging device 26. It should be noticed that when both of the friction brakes 21 and 22 are engaged, the sun gear 55 is prevented from rotating in either direction by means of the one-way engaging devices 25 and 26.

The gear set 19 of the rear unit B comprises a sun gear 91, a ring gear 92, a plurality of planet gears 93 in mesh with the sun gear 91, and a plurality of planet gears 94 in mesh with the planet gears 93 and the ring gear 92. The planet gears 93 and 94 are rotatably carried by a carrier 95. The ring gear 92 is secured to an annular flange member 96 which is splined on the driven shaft 11. The sun gear 91 is provided with a hub 97 which is splined to the rear end of the intermediate shaft 42.

The friction clutch 18 includes an inner member 98 splined on the hub portion 97 of the sun gear 91 and having external splines 99 with a plurality of clutch disks 100 splined thereon. A plurality of friction disks 101 are interleaved between the clutch disks 100, and the disks 101 are splined on internal splines 102 formed within an outer portion 103 of the carrier 95. Engagement of the clutch 18 is accomplished by means of compression springs 104 which act to urge a piston member 105 toward a clutch backing plate 106 secured to the splines 99 to clamp the disks 100 and 101 therebetween. A member 107 secured to the clutch member 98 provides an abutment for the ends of the springs 104 opposite to the piston 105. Disengagement of the clutch 18 is accomplished by admission of fluid under pressure to a clutch disengagement chamber 108 provided between the piston 105 and an opposing annular radially extending surface of the clutch member 98. An annular sheet metal oil retainer member 109 is secured within the member 103 forwardly of the clutch pressure plate 106. It will be noted that when the fluid pressure is relieved in the chamber 108, the springs 104 will engage the friction clutch 18 which locks the carrier 95 to the sun gear 91 of the gear set 19 to provide for direct drive through the gear set.

The friction brake 23 comprises an annular brake band 110 provided with an inner friction facing 111 which is adapted to engage a drum member 112 to prevent rotation of the drum when the brake is engaged. Contraction of the brake band 110 and engagement of the brake 23 is accomplished by admission of pressure fluid to a fluid actuated servo mechanism 110a (see Figure 10) of any suitable construction. The drum member 112 is secured to the outer portion 103 of the carrier 95 by means of interengaging teeth 113 on the drum and 114 on the carrier. Engagement of the brake 23, with the friction clutch 18 disengaged, holds the carrier 95 stationary to provide for a forward reduction drive through the planet gears 93 and 94 to the ring gear 92 and the driven shaft 11 when the sun gear 91 is driven by means of the intermediate shaft 42.

A rear fluid pump 115 is provided for cooperating with the front pump 43 to supply pressure fluid to the control system, to be described. The pump 115 comprises two intermeshing pump gears 116 (only one shown in Fig. 1) adapted to be driven by a pump drive gear 117, a gear 118 splined on the hub 97 of the sun gear 91 which, in turn, is splined on the intermediate shaft 42, and idler gears 118a and 118b in mesh with each other and drivingly connecting the gears 118 and 117. The rear pump 115 is thus positively driven by the intermediate shaft 42 at a ratio dictated by the pump drive gearing. Since the intermediate shaft 42 is the driven shaft of the forward transmission unit A and since the intermediate shaft and the driven shaft 11 are locked together when the friction clutch 18 is engaged, the pump 115 is directly responsive to vehicle speed whenever the clutch 18 is engaged. Therefore, in effect, the pump 115 may be considered a driven shaft pump whenever the clutch 18 is engaged.

A torque converter oil cooler 119 (Fig. 2) is provided for cooling the torque converter fluid before it enters the torque converter and is of the liquid-to-liquid type with the vehicle engine coolant being used as the cooling fluid. The oil cooler 119 may be of any suitable construction such as the annular fin type shown in which the torque converter hydraulic fluid is circulated through a finned construction 120 and coolant fluid is circulated within a chamber 121 provided about the finned construction 120. The operation of the oil cooler 119 will be described in connection with the transmission control system.

A transmission control arrangement hereinafter to be described is provided and includes a plurality of control valves which are located for the most part within a casing 122 secured at the bottom of the transmission casing 12.

The transmission construction intended for use with the fragmentary showing of Fig. 3 is identical with that of Figs. 1 and 2 except that additional brake means, in the form of a friction brake 123, are provided for two-way braking of the sun gear 55 to prevent free-wheeling of the transmission in third speed forward drive. The transmission including the sun gear brake 123 is illustrated diagrammatically in connection with the control arrangement subsequently to be described.

The friction brake 123 includes a brake disk 124 having a pair of friction facings 125, one on each side of the outer peripheral portion, and adapted to be clamped between a backing plate 126 connected to the transmission casing 12 and a movable pressure plate 127. The pressure plate 127 is adapted for being moved in response to fluid pressure to engage the brake disk 124, and a spring member 128 is provided to move the pressure plate 127 back to brake disengaging position, as shown, when the fluid pressure is relieved. The brake disk 124 is fixedly secured at its inner peripheral portion to an annular member 129 which is positively engaged by means of interengaging teeth 130 and 131 with a rearward extension 60a of the hub 60 of the sun gear 55. Therefore, fluid pressure actuation of the pressure plate 127 will engage the brake 123 to provide two-way braking of the sun gear 55.

The modified braking arrangement of Fig. 4 is provided for the same purpose as the brake arrangement 123 of Fig. 3. In this modified construction, a band type friction brake 132 comprises a brake band 133 having a frictional inner lining 134 which is adapted for engaging a brake drum 135 for holding the brake drum stationary. The brake drum 135 is provided with inner peripheral teeth 136 which engage with teeth 137 provided on the rearward extension 60a of the sun gear hub 60 of the sun gear 55. A fluid pressure responsive servo mechanism (not shown) is provided for causing engagement of the brake 132 in response to admission of fluid pressure to the servo in order to hold the brake drum 135 stationary and to provide two-way braking of the sun gear 55.

A power take-off arrangement may be provided in connection with the transmission, in which power is derived from the intermediate shaft 42 and particularly from the gear 118b driven from the shaft 42 by means of the gears 118 and 118a. The power take-off arrangement comprises a gear 138 splined onto a shaft 139 on which the gear 118b is fixed. A gear 140 slidably splined on a shaft 141 and moved by means of a shift fork 142, disposed in a suitable slot provided in the gear, may be moved into mesh with the gear 138 so that the shaft 141, which may be utilized as the power take-off shaft, may be driven from the shaft 42. The gear 140 and the shaft 141 are preferably provided in a suitable auxiliary casing adapted to be attached to the casing 12 of the transmission while the gear 138 and the shaft 139 are located within the transmission casing 12. The shaft 139 is also, incidentally, used as the drive shaft for a governor constituting a part of the transmission control system hereinafter to be described.

*Operation of the transmission mechanism*

Referring to Figs. 1 and 2, a first speed forward drive is provided through the transmission when the friction brakes 21 and 22 of the forward unit A and brake 23 of the rear unit B are engaged and the other friction engaging means of the transmission are disengaged. Engagement of the brake 21 holds the sun gear 48 of the gear set 15 stationary to provide a reduced forward rotation of the carrier 50 when the ring gear 51 is driven in the forward direction by means of the rotor 29 of the torque converter 13. The rotor 29 is driven through the hydraulic medium by the impeller 27 which, in turn, is driven by the drive shaft 10. Engagement of the friction brake 22 prevents reverse rotation of the sun gear 55 of the gear set 17 through the one-way engaging device 26 to provide a reaction in the gear set to produce a further reduced speed forward drive of the carrier 57 and the intermediate shaft 42 relative to the ring gear 58 when the ring gear is rotated forwardly by rotation of the output carrier 50 of the gear set 15. The one-way unit 25 acting between the sun gear sleeve portion 60 and the drum 77 through the annular member 85 assists the brake 21 in holding the sun gear 48 against reverse rotation. Engagement of the friction brake 23 of the rear unit B holds the carrier 95 of the gear set 19 stationary to provide a reaction for a reduced speed forward drive through the gear set, by means of the double planetary gearing, to the driven shaft 11 with the sun gear 91 of the gear set 19 being driven from the shaft 42. Thus, first speed forward drive provides a greatly reduced speed and increased torque of the driven shaft 11 relative to the drive shaft 10 by reduction drives through all three of the gear sets 15, 17 and 19 and by means of torque conversion in the hydrodynamic torque converter 13 when the stator 28 is stationary.

A second speed forward drive is provided through the transmission by disengaging the brake 23 and engaging the clutch 18 in the rear transmission unit B, and with the other friction engaging means conditioned as in first speed forward drive. The drive in second is the same as in first through the hydraulic torque converter 13 and the forward transmission unit A, but engagement of the clutch 18 in the rear unit B locks up this unit to provide a direct drive therethrough to decrease the overall drive ratio and thereby to decrease the torque multiplication and to increase the speed of rotation of the driven shaft 11.

It is noted that the sun gear locking brake 123 of Fig. 3 or the sun gear locking brake 132 of Fig. 4 may be engaged when the transmission is conditioned for either first speed or second speed forward drive. Engagement of the sun gear locking brake will not affect the drive ratio since the sun gear 55 of the gear set 17 is already braked against rotation in either direction by engagement of the friction brakes 21 and 22 acting through the one-way engaging devices 25 and 26, respectively. However, engagement of the sun gear locking brake will provide additional capacity for holding the sun gear 55 stationary if necessary.

Third speed forward drive through the transmission is obtained by engagement of the multiple disk clutch 16 with the brake 22 and the rear clutch 18 remaining engaged, and with the other friction engaging means of the transmission disengaged. The drive in third is through the hydraulic torque converter to the ring gear 51 of the forward gear set 15. Since engagement of the multiple disc clutch 16 locks the carrier 50 to the sun gear 48 of the gear set 15, a direct drive is provided through this gear set to the ring gear 58 of the second gear set 17. Reduced drive is provided through this gear set due to engagement of the brake 22 which prevents reverse rotation of the sun gear 55 through the one-way engaging device 26 to provide a reaction in the gear set so that the carrier 57 is driven forwardly at a reduced ratio. Since the rear unit B is locked up, the reduction drive through the gear set 17 is transmitted directly to the driven shaft 11 to provide an overall ratio which is lower than that in first and second to provide a relatively higher speed of the driven shaft 11.

In third speed drive, the sun gear 55 is not prevented from rotating forwardly with respect to the carrier 57 and the intermediate shaft 42 unless the sun gear locking brake 123 is engaged (or sun gear locking brake 132 of Fig. 4). Thus, under ordinary driving conditions, third speed is a freewheeling drive, but freewheeling may be prevented by engagement of the friction brake 123 (or the friction brake 132). The use of the sun gear locking brake in third speed forward is important when the engine is utilized as a vehicle brake in this drive ratio, such as with a heavily loaded truck going down a grade.

In order to provide fourth or high speed drive through the transmission, the lock-up clutch 14 is engaged directly connecting the drive shaft 10 and the intermediate shaft 42 to by-pass the hydraulic torque converter and the gear sets 15 and 17. In this ratio, the rear clutch 18 remains engaged so that direct drive is provided through the rear unit B and an overall one-to-one ratio is provided between the drive shaft 10 and the driven shaft 11. The multiple disc clutch 16 and the friction brake 22 remain engaged in high speed ratio, but they do not enter into the drive since the clutch 16 is by-passed and the one-way engaging device 26 disengages to allow forward rotation of the sun gear 55 of the gear set 17 when the ring gear 58 and the carrier 57 of this gear set are rotated at the same speed as the intermediate shaft 42.

Reverse drive through the transmission is obtained by engagement of the cone friction brake 20 and rear friction brake 23 with the other friction engaging means of the transmission being disengaged. The drive in reverse is through the hydraulic torque converter to the ring gear of the forward gear set 15 through the pinion gears 49 to the sun gear 48, which is rotated reversely with respect to the drive shaft since the brake 20 holds the carrier 50 stationary. The sun gear 48 drives the sun gear 55 of the gear set 17 in a reverse direction through the one-way engaging device 25 which engages when the sun gear 48 tends to rotate reversely with respect to the sun gear 55. Since the brake 20 also holds the ring gear 58 of the gear set 17 stationary, the carrier 57 is also driven reversely with respect to the drive shaft 10 and at a reduced ratio with respect to the sun gear 55, and this drive is imparted to the intermediate shaft 42. Since the brake 23 of the rear unit B is engaged, a reduction drive in the reverse direction is provided through the double planetary gearing 19 to achieve a final substantially reduced reverse drive of the driven shaft 11 with respect to the drive shaft 10.

For convenience, the following table is incorporated to illustrate the friction engaging means which are engaged in each drive, together with the drive ratios which can be obtained by proper selection of the gear sizes.

*Engaging means operated*

| Shift Position | Clutches | | | Brakes | | | | Ratio |
|---|---|---|---|---|---|---|---|---|
| | 14 | 16 | 18 | 20 | 21 | 22 | 23 | ¹123 | |
| Rev | | | | X | | | X | | 4.092 |
| 1 | | | | | X | X | X | X | 4.715 |
| 2 | | | X | | X | X | | X | 2.308 |
| 3 | | X | X | | | X | | X | 1.435 |
| 4 | X | X | X | | | X | | | 1.000 |

¹ Optional—for preventing freewheeling in third and for increasing torque capacity in 1st and 2nd.

The power take-off gear 140, when in mesh with the gear 138, and the power take-off shaft 141 are driven along with and at speeds having a definite ratio with respect to the shaft 42. The forward transmission unit A provides three speeds forward and one in reverse for the gear 140 and shaft 141, corresponding to the second, third, fourth and reverse drives of the transmission as a whole just described.

*Description of the control system*

The control system (see Fig. 11) includes generally a selector valve 143, a first speed shift valve 144, a multiple disk clutch valve 145, a 4—3 inhibitor valve 146, a governor valve 147, a centrifugal governor 148, a throttle valve 149, a rear pump by-pass valve 150, a torque converter valve 151, a mainshaft valve 152 (see Figs. 10 and 23), a transfer case shift rod servo 153 which may be used if a transfer case (hereinafter described) is used in connection with the transmission as thus far described, and a torque converter oil cooler 154. Pressure fluid for actuating the valves to provide the various speed ratios is provided by the front pump 43 driven by the drive shaft 10 and the rear pump 115 driven by the intermediate shaft 42.

The selector valve 143 includes a casing portion 155 having a cylindrical bore 156 therein with a valve member 157 axially slidably mounted in the bore. The valve member 157, from its right end to its left end, is provided with a land 158, an elongated groove 159, a land 160, elongated groove 161, a land 162, an elongated groove 163, and an elongated land 164. The elongated land 164 is provided with a plurality of annular indentations 165 about its outer periphery with the indentations corresponding to the various transmission control positions, neutral (N), automatic drive (D), third speed ratio (3), second speed ratio (2), first speed ratio (1), and reverse speed ratio (R), looking from the left end of the elongated land to its right end. Detent means 166 are provided in the form of a spring pressed ball 167 which is adapted to resiliently hold the valve member 157 in the selected drive control position by engaging in the indentation corresponding to the selected drive ratio. Axial shifting of the valve member 157 to select the various drive ratios is accomplished through a lever 168 which engages in a slot 169 formed in an extension 170 at the left end of the valve member. The lever 168 may be connected in any suitable manner to a shift lever (not shown) which is adapted for actuation by the driver of the vehicle.

The casing portion 155 of the valve 143 is provided with a plurality of ports 171, 172, 173, 174, 175, 176, 177, 178 and 179. The ports 171 and 179 are relief ports which communicate with a transmission oil reservoir or sump 180 (see Fig. 1) which is provided at the bottom of the transmission casing 12.

The first speed shift valve 144 (see Figs. 11 and 17) includes a casing portion 181 having a cylindrical bore 182 therein with a valve member 183 axially shiftably mounted therein. A second valve member 184 is also axially shiftably mounted in the bore 182 and is located to the left of the valve member 183. The valve member 183, looking from its right end to its left end, is provided with an elongated land 185, a groove 186, a land 187, a groove 188, a land 189, a groove 190 and a land 191. The valve member 184 comprises a single central land 192 with reduced diameter integral buttons 193 and 194 adapted to engage the left end of the valve member 183 and the left end of the bore 182, respectively. A compression spring 195 is bottomed within a cavity 196 provided at the right end of the land 185 with the right end of the spring engaging the right end of the bore 182. Thus, the spring 195 urges the valve member 183 against the valve member 184 and, in turn, resiliently holds the valve member 184 against the left end of the bore 182.

The casing portion 181 of the valve 144 is provided with a plurality of ports 197, 198, 199, 200, 201, 202, 203, 204, 205, 206 and 207, looking from the right end of the casing portion 181 to its left end. The port 197 communicates with an enlarged chamber 208 provided at the right end of the bore 182 and containing the spring 195. The port 201 communicates with the groove 188 of the valve member 183 and is connected by means of a conduit 209 with the port 197. The ports 198 and 203 are connected by means of a conduit 210 with the port 177 of the selector valve 143. The port 199 is connected by means of a conduit 211 with the clutch disapply chamber 108 of the rear clutch 18. The ports 200 and 205 are relief ports communicating with the sump 180. The port 204 is connected by means of a conduit 212 with the brake apply chamber of the servo mechanism 110a. The port 206 is connected by means of a conduit 213 with the port 172 of the selector valve 143, and the port 207 is connected by means of a conduit 214 with the port 178 of the selector valve.

The multiple disc clutch valve 145 (Fig. 18) includes a casing portion 215 having a cylindrical bore 216 with a valve member 217 and another valve member 218 axially slidably disposed therein. The valve member 217 is formed with a reduced diameter end extension 219, a land 220, a groove 221, a land 222, a groove 223, and a land 224, starting at the right end of the valve member and working to its left end. The left end land 224 is provided with an end cavity 225 which has a compression spring 226 bottomed therein with the other end of the compression spring abutting the left end wall of the bore 216 so that the valve member 217 is urged toward the right by means of the compression spring. The valve member 218 comprises a land 227 with a reduced diameter button 228 adapted for abutting the end of the extension 219 of the valve member 217 and a button 229 adapted for abutting a plug 230 which closes the right end of the bore 216. It will be seen that the spring 226 resiliently holds the valve member 217 against the valve member 218 which, in turn, holds the valve member 218 against the plug 230. A stop 231 is provided between the land 220 of the valve member 217 and the left end of the valve member 218 to limit the movement of the valve member 218 toward the left. Flow communication notches 232 are provided in the left end marginal portion of the land 224 of the valve member 217.

Looking from the right end of the casing portion 215 toward its left end, the casing portion is provided with a port 233, a port 234, ports 235, a port 236, a port 237, a port 238, ports 239, a port 240 and a port 241. The port 233 is connected by means of a conduit 242 with the brake apply chamber of the brake 123 for the sun gear 55. The ports 235 and 239 are relief ports communicating with the sump 180. The port 236 is connected by means of a conduit 243 with the clutch apply chamber 80 of the multiple disc clutch 16. The port 237 is connected by means of a conduit 244 with the port 175 of the selector valve 143, and a conduit 245 connects the conduit 244 with the brake apply chamber of the servo 89 for the forward brake 22. The port 238 is connected by means of a conduit 246 with a conduit 247 which connects the port 241 and the brake apply chamber of the servo 84 for the friction brake 21. The port 240 is connected by means of a conduit 248 with the port 173 of the selector valve 143.

The 4—3 inhibitor valve 146 (Fig. 19) includes a casing portion 249 provided with a lower bore 250 containing an axially movable valve member 251 and an upper bore 252 containing another axially movable valve member 253. The valve member 251 is formed with a right hand land 254, a central groove 255 and a left hand land 256 which is provided with a substantially reduced diameter extension 257. The land 254 is provided with an end cavity 258 which has a compression spring 259 bottomed therein with the other end of the spring abutting the right end wall of the bore 250. It will be seen that the spring 259 normally holds the valve member 251 toward the left with the extension 257 contacting the left end wall of the bore 250. The valve member 253 comprises a land 260 with a substantially reduced diameter extension 261 at its left end. The land 260 is provided with an end cavity 262 with a compression spring 263 bottomed therein. The other end of the spring 263 abuts the right end wall of the bore 252 so that the spring resiliently urges the valve member 253 toward a position with the extension 261 abutting the left end wall of the bore 252.

Starting at the bottom of the casing portion 249 and working around a clock-wise direction, the casing is provided with a port 264, a port 264a, a port 265, a port 266, a port 267, a port 268, and a port 269. The ports 264a and 269 are connected by means of a conduit 269a. A central port 270 connects the left end portion of the bore 252 with the central portion of the bore 250 so that the groove 255 of the valve member 251 is always in communication with the left end of the land 260 of the valve member 253. The ports 264 and 268 are relief ports communicating with the sump 180. The valve member 253 is provided with an axially extending elongated extension portion 271 joining the valve member at the bottom of the cavity 262 and extending in spaced relation through the relief port 268. The port 265 is connected by means of a conduit 272 with the port 174 of the selector valve 143. The port 266 is connected by means of a conduit 273 with the port 202 of the first speed shift valve 144. The port 267 is connected by means of a conduit 274 with the conduit 242 which, in turn, is connected to the brake apply chamber of the sun gear brake 123.

The governor valve 147 (Fig. 20) includes a casing portion 275 provided with a cylindrical bore 276 having a valve member 277 axially movably disposed therein. The valve member 277 is formed with a right end land 278, a groove 279, a land 280, a groove 281, a land 282, and a left end reduced diameter extension 283. The casing portion 275 is provided with three upper axially spaced ports 284, 285 and 286 and a lower port 287. The port 284 is a relief port communicating with the sump 180. The port 285 is connected by means of a conduit 288 with the clutch apply chamber 41 of the direct drive clutch 14. The port 286 is connected by means of a conduit 289 with the port 234 of the clutch valve 145. The port 287 is connected by means of a conduit 290 with the conduit 245 which interconnects the port 175 of the selector valve 143 and the brake apply servo 89 of the forward brake 22.

A pair of needle pistons 291 and 292 are axially disposed in respective bores 293 and 294 formed in the casing portion 275 of the governor valve 147. The left end portions of each of the needle pistons extend out of the casing and are adapted to abut a connector member 295 which is connected to the left end of the extension 283 of the valve member 277. The right end of the bore 293 is connected by means of a passage 296 with the bore 276, and the right end of the bore 294 is connected by means of a passage 297, axially spaced toward the left from the passage 296, with the bore 276. Axial movement of the needle piston 292 to the left is restricted only by the position of the member 295. Axial movement of the needle piston 291 toward the left is also restricted by the member 295 and is further restricted by means of a stop 298 fastened to the piston 291 which engages a stop 299 formed on the casing portion 275 when the piston 291 has moved a predetermined distance toward the left.

The centrifugal governor 148 (Fig. 11) may be of any suitable construction and is shown as comprising a pair of centrifugal fly-weights 300, each attached by a pair of pivotally connected arms 301 with a pair of axially movable members 302 and 303. The members 302 and 303 are resiliently urged away from one another by means of a compression spring 304 disposed axially therebetween and tending to resiliently draw the fly-weights 300 toward the axis of the governor through the pivotal arms 301. The member 303 is connected to the member 295 in a manner such that axial movement of the member 303 causes movement of the connector member 295 toward the right or left while maintaining the vertical attitude of the connector 295 as shown to move the valve member 277 of the governor valve 147 in accordance with the position of the governor member 303. The governor member 302 is adapted to abut an accelerator controlled member 305.

In order to provide accelerator influenced operation of the governor 148, a vehicle accelerator pedal 306, which is connected by any suitable linkage 307 with a throttle butterfly valve 308 of a vehicle carburetor 309, is adapted to actuate a lug 310 connected to the throttle linkage 307. The lug 310 is arranged to abut the throttle controlled member 305 which is connected to the governor member 302. As will be seen, when the vehicle accelerator 306 is depressed, the throttle butterfly valve 308 is moved toward open throttle position, and at the same time the accelerator controlled member 305 is moved toward the right to compress the governor spring 304. When the accelerator pedal is released, the lug 310 is moved toward the left to allow the governor spring 304 to move the accelerator controlled member 305 back to the position shown in Fig. 11. It will be understood that the lost motion connection provided by the members 305 and 310 is shown schematically only, and any suitable lost motion means may be provided in place of that shown.

The throttle valve 149 (Fig. 11) comprises a casing portion 311 having a cylindrical chamber 312 therein containing an axially movable piston member 313 aligned with the axis of the governor 148. The piston member 313 is formed with a head 314 at its left end and a reduced diameter stem 315 at its right end. A compression spring 316 is disposed about the stem 315 and is disposed between the shoulder formed at the junction of the stem 315 and the head 314 on one end and inwardly turned end portions 311a on the casing portion 311 at the other end. The spring 316 thus resiliently urges the piston member 313 toward the left end of the bore 312. An adjustable idle stop in the form of an eccentric 305a is provided for the accelerator controlled member 305 and consequently the governor controlled member 302. The eccentric 305a may be put into different rotatably adjusted positions for variably limiting the end position to which the piston 313 and governor member 302 may come. The light throttle shift speeds may be adjusted by the eccentric 305a as will appear from a subsequent description of operation of the transmission controls.

A port 317 is provided in the left end of the casing portion 311 and is connected by means of a conduit 318 with the conduit 248 which, in turn, is connected to the port 173 of the selector valve 143. When pressure is admitted to the throttle valve 149 through the port 317, the piston 313 is moved toward the right as shown in Fig. 12, for example, to move the accelerator controlled member 305 to its extreme right hand position and to compress the spring 304 of the governor 148. It will be noted that the throttle linkage 307 is not affected because of the lost motion arrangement provided by the lug 310 which is disengaged from the member 305 when the throttle valve is energized.

The rear pump by-pass valve 150 (Fig. 21) includes a casing portion 319 provided with an internal bore 320 having a valve member 321 reciprocably disposed therein. The valve member 321 is formed with a right end land 322, a center groove 323, and a left end land 324. The left end of the land 324 is provided with an integral reduced diameter extension 325 which is adapted to abut the left end wall of the bore 320. A compression spring 326 is bottomed in an end cavity 327 formed in the land 322, and the other end of the spring 326 abuts a closure member 328 closing the right end of the bore 320. The spring 326 resiliently urges the valve member 321 into the left hand position shown in Fig. 21.

The casing portion 319 is provided with ports 329, ports 330, a port 331, ports 332, a port 333, and a port 334. In addition, a reduced diameter orifice connection 335 is provided between the ports 333 and 334, and a reduced diameter orifice outlet 336 communicates between the port 333 and the sump 180 of the transmission. The ports 329, 330 and 332 are outlet ports communicating with the transmission sump 180. A set of calibrating relief orifices 319a (one shown) and another set of calibrating relief orifices 319b (one shown) are formed through the casing 319 between the relief ports 332 and the port 333 and communicate with the sump 180. The two sets of calibrating orifices are axially spaced from one another as shown. The port 331 is connected by means of a conduit 337 with the conduit 214 which is connected to the port 178 of the selector valve 143. The port 333 is connected by means of a conduit 338 with the conduit 273 which connects the port 202 of the first speed shift valve 144 with the port 266 of the 4—3 inhibitor valve 146. The port 334 communicates with the outlet side of the rear pump 115 by means of a conduit 339. Additional radially opposite ports 340 are provided through the casing 319 axially located between the ports 330 and the port 331. One of the ports 340 is connected to a conduit 341. The other port 340 is connected by means of a conduit 342 with the brake apply chamber 71 of the cone friction brake 20.

The torque converter valve 151 (Fig. 22) comprises a casing portion 343 having an internal bore 344 with a valve member 345 axially movably disposed therein. The valve member 345 comprises an elongated land 346 with a right end reduced diameter extension 347 adapted for engaging a plug 348 closing the right end of the bore 344. The land 346 is provided with a port 349 communicating with an internal open ended bore 350. A compression spring 351 is bottomed in the bore 350 with the other end of the compression spring seating on a washer 352 so that the compression spring 351 tends to urge the valve 345 to the right against the plug 348. The washer 352 abuts the right end of a sleeve member 353 which is secured within the left end portion of the bore 344. A second valve member 354 is axially movably disposed in an internal bore 355 provided by the sleeve member 353. The valve member 354 comprises a head portion 356 at its left end and a reduced diameter elongated stem portion 357 at its right end, with the stem portion 357 extending in spaced relation into the cavity 350 in the valve member 345 and with the right end of the stem being normally spaced from the bottom of the cavity.

The casing portion 343 is provided with an inlet port 358 connected by means of a conduit 359 with the front pump 43. A second port 360 is formed in the casing portion 343 and is connected by conduit means 361 with the fluid torque converter 13 for supplying working fluid to the torque converter. The port 360 and the valve port 349 are arranged for continuous communication. The sleeve portion 353 is provided with a left end port 362 connected by means of a conduit 363 to the conduit 342 connecting the port 340 of the rear pump by-pass valve 150 with the brake apply chamber 71 of the cone brake 20. The valve member 345 is urged toward the right to close communication between the ports 358 and 360 when the valve member extension 347 abuts the plug 348.

The main shaft valve 152 (Fig. 23) includes a casing portion 364, which is disposed in a hollow portion of the intermediate shaft 42, having a first bore 365 therein connected by means of a reduced diameter internal port 366 with a larger diameter bore 367 at the right end of the casing portion. A valve member 368 is axially movably disposed within the casing portion 364 and includes a left end land 369 axially movably disposed in the bore 365 and a right end hollow land 370 axially movably disposed within the bore 367 with a reduced diameter stem member 371 interconnecting the lands 369 and 370 and extending in spaced relation through the internal port 366. A compression spring 372 acts between the right end of the land 370 and a washer 373 fixedly disposed at the open right end of the bore 367, so that the spring 372 urges the valve member 368 toward the left to contact the left end of the land 370 with a shoulder 374 formed at the juncture of the port 366 and the bore 367. The fluid discharged from the torque converter 13 is communicated to the main shaft valve 152 by means of a port 375 formed through the intermediate shaft 42 and the valve casing 364 and communicating with the bore 367. A passage 376 is connected to the port 375 and communicates with the bore 365. When the valve member 368 is in its left hand position as shown, the port 375 is blocked from communication with the bore 367 by the land 370 while the passage 376 continuously communicates with the bore 365 between the left end of the land 369 and a plug 377 closing the left end of the bore 365. Pressure against the left end of the land 369 biases the valve member 368 against the force exerted by the spring 372 to open the port 375, and fluid passing through the port 375 is discharged through the open right end of the bore 367 into the hollow center of the intermediate shaft 42. This discharged fluid can be utilized to lubricate the moving parts of the transmission after which it drops down into the sump 180.

The shift rod servo 153 (Fig. 11) for controlling the transfer case hereinafter to be described, and which may be used with the transmission if desired, comprises a casing portion 378 having a cylindrical bore 379 therein, with a piston 380 movably disposed in the bore. A rod 381 is secured to the piston and extends out of the casing portion 378 and a compression spring 382 is disposed about the rod 381. The casing portion 378 is provided with a port 383 at its left end communicating by means of a conduit 384 with a portion of the conduit 363 connected to the conduit 342 which interconnects the port 340 of the rear pump by-pass valve 150 and the brake apply chamber 71 of the conical brake 20. A sealing ring 385 is disposed in a groove formed about the outer periphery of the piston 380 in order to prevent leakage past the piston.

The torque converter oil cooler 154 (Fig. 11) is connected to the conduit 361 leading from the torque converter valve 151 by means of an inlet conduit 386 for conducting fluid into the finned construction 120 (Fig. 2) and an outlet conduit 387 which conducts fluid back to the conduit 361 at a position downstream of the connection to the inlet 386. A by-pass valve 388 is disposed in the conduit 361 between the connections to the oil cooler 154 and comprises a casing portion 389 having a ball check member 390 adapted for seating against an inlet shoulder 391 under the influence of a compression spring 392. If the flow path through the cooler 154 should be restricted in any manner, or if the total flow from the torque converter valve 151 is greater than the flow capacity of the cooler, the check valve 388 will unseat to permit fluid to by-pass the oil cooler. Cooling of the fluid passing through the oil cooler is accomplished by passing coolant liquid, such as water from the vehicle cooling system, into and out of the chamber 121 of the cooler (Fig. 2) by means of conduits 393 and 394.

In order to prevent fluid flow from the front pump 43 to the rear pump 115, and to allow fluid flow from the rear pump to the front pump outlet under conditions when the front pump is inoperative, an auxiliary check valve 395 is provided in a conduit 396 connecting the rear pump outlet with the front pump outlet. The valve 395 comprises a casing portion 397 having a ball check member 398 therein resiliently urged into closing relation with a port 399 by means of a compression spring 400.

It will be seen that pressure from the front pump 43 tends to close the check valve while pressure from the rear pump 115 tends to open the check valve. The spring 400 is of sufficient strength so that the valve is closed when both pumps are operating unless the front pump is operating at a substantially reduced capacity such as when the vehicle engine is idling with the vehicle coasting at a substantial speed. The auxiliary valve 395 is important for preventing reverse flow from the front pump into the rear pump while at the same time allowing flow from the rear pump into the pressure system under conditions when the vehicle engine is inoperative and the vehicle is pushed or towed for starting the engine.

In order to supply fluid from the front pump 43 to the valving system, other than the torque converter valving, a conduit 401 extends from the conduit 359 connected to the front pump inlet to the port 176 of the selector valve 143.

The front pump 43 has an inlet passage 402 connected to the sump 180 of the transmission, and the pump has an outlet passage 403 which is connected to the pressure supply conduit 401. The inlet passage 402 terminates in a semi-circular slot 404a, and the outlet passage 403 is connected to a semi-circular slot 404b on the other side, both of the slots 404a and 404b being in the body of the pump. A cavity 405 is provided between the reciprocable pump casing 46 and the relatively stationary pump housing 46c, and a spring 406 is provided in the cavity 405 and acts between the housing 46c and the casing 46 tending to move the casing 46 upwardly in the housing 46c on the ways 46b. A cavity 407 is provided at the other end of the pump casing 46, and fluid under pressure in the cavity 407 will tend to move the pump casing 46 downwardly on the ways 46b against the action of the spring 406.

A reverse pressure increase valve 408 is provided in connection with the pump 43. The valve 408 comprises a valve casing 409 having an internal cylindrical cavity 410 formed therein. A plug 411 is fixed in the right end of the cavity 410 and is provided with an internal cylindrical open ended cavity 412 in its left end. The plug is also provided with a cavity 413 having ports 414 in communication therewith. A piston 415 is provided having a land 416 slidably disposed in the cavity 412. The piston 415 is also provided with an end portion 417 of reduced diameter.

A plunger 418 is provided in the left end of the cavity 410. The plunger has an internal cavity 419 connected with ports 420 in the external periphery of the plunger. The plunger 418 is also provided with an annular groove 421 in its outer surface. A compression spring 422 is provided between the plunger 418 and the plug 411.

The casing portion 409 is provided with ports 423, 424, 425, 426 and 427. The port 423 is connected to the conduit 341; the port 424 is connected to the inlet passage 402 of the pump; the port 425 is connected to the chamber 407 above the pump casing 46; the port 426 is connected to the other chamber 405 below the pump casing 46; and the port 427 is an exhaust port discharging into the sump 180 of the transmission. In addition, the cavity 410 at its left end is connected to the outlet cavity 404b of the pump and to the conduit 401.

*The transfer case assembly*

The transfer case assembly now to be described may be used or not, as desired, in connection with the transmission. The transfer case assembly comprises a drive shaft 428 adapted to be connected to and driven by the driven shaft 11 of the transmission. The shaft 428 has a gear 429 rotatably disposed thereon which carries a clutch element 430 provided with a plurality of internal teeth 431. A gear 432 is also rotatably disposed on the shaft 428 and has fixed thereto a clutch element 433 which is provided with a plurality of internal teeth 434. A clutch element 435 is slidably splined on to the shaft 428 and is provided with external clutches 436 and 437 adapted to mesh respectively with the internal clutch teeth 431 and 434. The clutch element 435 is provided with an outer flange 438 embraced by a collar 439 which is fixed on a shift shaft 440.

A countershaft 441 is provided in spaced relation to the shaft 428 and has gears 442 and 443 formed thereon. The gear 442 is in mesh with the gear 429, and the gear 443 is in mesh with the gear 432. A third gear 444 is also formed on the shaft 441.

The transfer assembly includes two driven shafts 445 and 446. The shaft 445 is adapted to be connected by any suitable drive connections (not shown) with the rear axle and wheels of the vehicle in which the transmission is installed, and the shaft 446 is adapted to be connected by any suitable drive connections (not shown) with the front axle and wheels of the vehicle. The shaft 446 is disposed coaxially with respect to the shaft 445 and is piloted in the shaft 445 by means of a pilot shaft portion 446a.

A gear 447 is formed on the shaft 445, and a gear 448 is rotatably disposed on the pilot shaft portion 446a and has fixed thereto a clutch hub portion 449 formed with external teeth 450. A clutch shell 451 is disposed over the hub portion 449 and is provided with elongated internal teeth 452 in mesh with the clutch teeth 450. The clutch sleeve 451 is provided with additional internal teeth 453 adapted to mesh with either the external clutch teeth 454 provided on a clutch sleeve 455 or with external clutch teeth 456 provided on a clutch sleeve 457.

One-way clutch rollers 458 are provided between the sleeve 455 and the shaft 446, and one-way clutch rollers 459 are provided between the sleeve 457 and the shaft 446. Suitable cams are provided on the interior surface of the sleeve 455 so that the rollers 458 will engage between the sleeve 455 and the shaft 446 when the sleeve 455 is driven in the forward direction, that is, in the same direction the shaft 428 and shaft 10 are rotated, to provide a one-way drive in the forward direction to the shaft 446. Suitable cams are provided on the interior surface of the sleeve 457 which cooperate with the rollers 459 so that, when the sleeve 457 is rotated in the reverse direction, the rollers 459 will provide a one-way drive in this direction to the shaft 446. The rollers 458 and 459 and the associated cams are well-known in the one-way clutch art, and further detailed description is thus not deemed necessary.

The sleeve 451 is provided with an external annular groove 460 for receiving a collar 461 which is fixed on the shaft 381 of the servo-motor 153.

The transfer case is conditioned for a high speed drive by moving the shaft 440 and the hub 435 so as to engage the teeth 437 with the teeth 434 in the clutch sleeve 433. The drive is then from the shaft 428 through the clutch hub 435, the teeth 437 and 434, the clutch element 433, the gear 432, the gear 443 and the gear 447 to the shaft 455 connected with the rear axle of the vehicle.

The clutch sleeve 451 for forward drive is shifted to engage its teeth 453 with the teeth 454 on the clutch sleve 455 so that the one-way clutch comprising the rollers 458 drives the shaft 446 from the gear 448 in the forward direction. The drive train to the shaft 446 in high speed is from the gear 443, also in the rear axle drive, to the counter shaft 441, the gear 444 fixed on the countershaft, the gear 448, the clutch teeth 450 and 452, the clutch sleeve 451, the clutch teeth 453 and 454, and the one-way clutch comprising the rollers 458 to the shaft 446. The sizes of the gears is preferably such that the shaft 446 is driven through the one-way clutch comprising rollers 458 at a speed slower than the shaft 445 is driven so that the shaft 446 only actually drives when the rear wheels of the vehicle are slipping. In general, then, the clutch comprising the rollers 458 overruns. To accomplish this result, the gear 444 is slightly smaller than the gear 443, and the gear 448 is slightly larger than the gear 447. In an actual embodiment, the gears 432 and 447 may have thirty-three teeth, the gear 443 may have twenty-two teeth; the gear 444 may have twenty-one teeth; and the gear 448 may have thirty-four teeth.

The transfer case is conditioned for low speed drive by moving the shift collar 435 to the left to engage the teeth 436 with the teeth 431. The drive then includes the shaft 428, the hub 435, the teeth 436 and 431, the gears 429 and 442, and the countershaft 441. The shaft 445 is driven from the countershaft 441 through the gears 443 and 447, and the shaft 446 is driven from the countershaft 441 through the gears 444 and 448, the clutch teeth 450 and 452, the clutch sleeve 451, the clutch teeth 453 and 454 and the one-way clutch comprising the rollers 458. In this speed also, the one-way clutch comprising the rollers 458 overruns unless there is slippage of the rear wheels of the vehicle. The gears 429 and 442 function as compared with the gears 432 and 443 in high speed drive, to drive the countershaft 441 at a slower speed than in high speed drive. For this purpose, the gear 429 may be provided in the actual embodiment with twenty-five teeth, and the gear 442 may be provided with thirty-three teeth.

The drives in reverse proceed through the same gears for either low speed or high speed as for forward drive in either speed, the shaft 428 simply being rotated in the reverse direction, that is, in the direction opposite with respect to the direction of rotation of the drive shaft 10. In this case, however, for the shaft 446 to be driven when there is slippage at the rear wheels of the vehicle, the clutch collar 451 is in its right hand position with teeth 453 and 456 in mesh, and the one-way clutch comprising the rollers 459 is effective, instead of the other one-way clutch, so as to drive the shaft 446 in the reverse direction.

*Operation of the control system*

The control system of the present invention provides for automatic ratio changing between second, third and fourth speed ratios forward when the selector valve 143 is in the "D" or drive position. The ratio changing is controlled in accordance with vehicle speed as sensed by the centrifugal governor 148 and vehicle torque requirements as indicated by the amount of depression of the accelerator pedal 306. Drive in either first, second or third speed ratio may be maintained at any vehicle speed by placing the selector valve 143 in the corresponding position, which actuation comprises manual control of ratio changing.

With the selector valve 143 in the neutral position as shown in Fig. 11 the pressure supply port 176 of the selector valve, which receives pressure fluid from the front pump 43 through the conduit 401, is blocked from communicating with any of the ports of the selector valve, except for the port 177, by means of the lands 160 and 162 on the valve member 157. Pressure fluid which is communicated to the conduit 210 from the selector valve port 177 is blocked at the port 203 of the first speed shift valve 144 by the land 189 and is blocked at the port 198 by the land 185 of the valve member 183. Therefore, none of the pressure actuated friction engaging means is engaged.

Fluid under pressure is communicated from the front pump through the conduit 359, the port 358 of the torque converter valve 151, the port 360 and the conduit 361 to the torque converter 13 to maintain the torque converter filled with fluid under pressure. The torque converter valve 151 is a regulating valve and functions to maintain the pressure in the torque converter at a predetermined reduced value with respect to the pressure within the conduit 359. In an actual embodiment of the transmission controls, the valve 151 maintains the pressure in the conduit 361 and in the torque converter 13 at the reduced pressure of 35 lbs. per sq. in. with the pressure in the supply conduit from the pump 43 being 90 lbs. per. sq. in. for forward drives. The fluid under pressure from the conduit 359 is applied to the right end of the valve piston 345 moving the piston to the left as seen in Fig. 22 against the action of the spring 351 so as to provide a slight opening between the end of the piston 345 and an edge of the port 360 and admit fluid under pressure into the conduit 361 connected with the port 360. The pressure in the conduit 361 flows through the opening 349 in the piston 345 and augments the force derived from the spring 351 tending to move the piston 345 back again to the right to close the port 360, the net result being that the fluid in the torque converter 13 and in the conduit 361 is maintained at a predetermined lower value than the fluid pressure in the conduit 359. The plunger 354 remains in the position in which it is shown in Fig. 22 for neutral condition of the transmission as well as for all forward drives of the transmission and is not under these conditions effective on the piston 345.

Under ordinary conditions, the fluid flowing through the conduit 361 to the torque converter 13 flows through the cooler 154 and by-passes the check valve 388, and the fluid within the torque converter is thus maintained at a low temperature. When the oil flowing the conduit 361 is exceptionally viscous, as, for example, when it is cold, the oil cooler 154 impedes its flow, and at this time the ball 390 is moved off its seat 391 against the action of the spring 392 in the check valve 388 and part of the oil by-passes the cooler 154 to flow into the torque converter 13.

The valve 152 (see Fig. 23) relieves the oil within the torque converter 13, and oil discharged from the valve 152 is used to lubricate working parts of the transmission gearing. The oil from the converter flows through the port 375 to the port 376 and acts on the land 369 so as to move the land 369 and the hollow land 370 connected therewith by the rod portion 371 to the right against the action of the spring 372. This movement of the hollow land 370 opens the port 375 to the interior of the valve part 370 and allows oil to flow through the port 375 and the cylindrical valve part 370 to the right as seen in Fig. 23 out through the valve part 364 to relieve the fluid pressure in the torque converter 13. The greater the pressure in the torque converter tends to become, the farther the plunger 368 will be moved to the right and the greater will be the opening of the port 375 by the cylindrical valve part 370, so that the valve 152 cooperates with the valve 151 to maintain the pressure in the torque converter at a predetermined reduced value such as the 35 lbs. per square inch previously mentioned. The valve 152 closes below a predetermined fluid pressure less than the value just mentioned to maintain the torque converter filled with fluid when the pump 43 is inactive.

The pressure in the conduit 401 is automatically maintained at a predetermined maximum value, for example 90 lbs. per square inch, by action of the valve 408 acting in conjunction with the variable displacement pump 43. The output pressure of the pump discharged through the conduit 401 is impressed on the left end of the plunger 418 and tends to move the plunger 418 to the right against the action of the spring 422. The output side of the pump 43 is in communication with the ports 420 by means of the cavity 419 and may flow through the ports 420 into either the port 426 or the port 425 in the valve casing 409, depending on the position of the plunger 418. Initially, when the plunger 418 is at the limit of its movement to the left, the fluid pressure flows through the ports 420 and 426 and thereby into the cavity 405 so that the fluid pressure assists the spring 406 in holding the slidable pump casing 46 at the limit of its movement upwardly at which time there is the maximum eccentricity between the part 44 carrying the vanes 45 and the internal cylindrical surface 46a of the pump casing 46. The part 44 is rotated from the drive shaft 10 through the medium of the impeller 27 of the torque converter 13 and the vanes in contact with the internal cylindrical surface 46a of the pump casing part 46 have a fluid pumping action drawing liquid from the slot 404a and discharging it under pressure in the slot 404b. As this fluid pressure increases, it acts on the plunger 418 moving it to the right against the action of the spring 422 and causing the ports 420 to be blocked from communication with the port 426 and come into communication with the port 425. The port 425 is connected with the cavity 407 and the fluid under pressure in the cavity 407 acts on the pump casing part 46 moving it downwardly on the ways 46b against the action of the spring 406 to decrease the eccentricity between the part 44 and the cylindrical surface 46a and to thereby decrease the pumping action of the pump 43. This movement of the pump casing part 46 continues until the pressure in the conduit 401 is stabilized at the predetermined desired maximum value. A decrease in fluid pressure in the conduit 401 acting on the plunger 418 causes the plunger 418 to move to the left under the action of the compression spring 422 while an increase in the fluid pressure in the conduit 401 causes the plunger 418 to move to the right against the spring 422, respectively providing fluid pressure in the cavity 405 or the cavity 407 so that the pump 43 has a regulating action to maintain the pressure in the conduit 401 at a substantially uniform desired value. This value in an actual embodiment may be 90 lbs. per square inch. The plunger 415 is in its illustrated position as shown in Fig. 11 for neutral and forward drive conditions of the transmission and acts as will be hereinafter described, for reverse drive against the plunger 418 for increasing the regulated pressure in the conduit 401 for reverse drive.

In order to operate the transmission continuously in first speed forward, the selector valve 143 is placed in the first speed position as shown in Fig. 12. With the selector valve in this position, fluid under pressure passes from the front pump 43 through the conduit 401 to the groove 161 of the selector valve which now spans all of the ports 172, 173, 174, 175, 177 and inlet port 176, so that fluid under pressure is communicated to all of the connected conduits.

Fluid entering the conduit 213 from the port 172 passes through the port 206 of the first speed shift valve 144 to urge the valve member 183 to its right hand position as shown in Fig. 12 against the compression of the spring 195. Shifting of the valve member 183 to the right connects the conduit 210 and its port 203, which receive pressure fluid from the port 177 of the selector valve, with the conduit 212 leading to the brake apply servo 110a of the auxiliary brake 23 by means of the groove 190 of the valve member 183 and the port 204. The conduit 210 is also placed in communication with the conduit 211 connected to the clutch disapply chamber 108 of the auxiliary clutch 18 by means of the port 198, the groove 186 and the port 199. Thus, the brake 23 is engaged and the clutch 18 is disengaged to condition the rear transmission unit B for reduced drive therethrough.

Pressure fluid is communicated to the brake apply servo 84 of the brake 21 through the port 173 of the selector valve, the conduit 248, the port 240 of the multiple disk clutch valve 145, the notches 232 in the valve member 217, the port 241 and the conduit 247, so that this brake is engaged to hold the sun gear 48 stationary and to brake the drum member 77. Pressure fluid is communicated to the brake apply servo 89 of the brake 22 by means of the selector valve port 175 and the conduit 245 to apply the forward brake 22. Fluid is also communicated to the conduit 244 but the connecting port 237 of the multiple disk clutch valve is blocked by the land 222 of the valve member 217.

Pressure fluid is communicated from the conduit 248 through the conduit 318 to the throttle valve 149 to urge the piston member 313 to its right hand position to fully compress the governor spring 304. Since the governor spring is fully compressed, the centrifugal fly-weights 300 cannot be effective to move the governor controlled member 295 in order to actuate the governor valve 147, so that the governor valve is held in its extreme right hand position as shown. Thus, pressure fluid which is communicated to the governor valve port 287 by means of the conduit 290 is blocked from passing to either the conduit 289 or the conduit 288 by means of the land 280 of the governor valve member 277. Thus, the transmission will remain in first speed ratio regardless of vehicle speed as long as the selector valve remains in the first speed position.

Pressure fluid is also transmitted through the selector valve port 174, the conduit 272, the port 265 of the 4—3 inhibitor valve 146, the groove 255 of the valve member 251, the internal port 270, around the reduced diameter portion 261 of the valve member 253, the port 267, the conduit 274, and the port 233 of the multiple disk clutch valve 145 behind the valve member 218 of the multiple disk clutch valve. However, the pressure introduced here cannot move the valve member 218 and the valve member 217 to the left since the same pressure is acting on the left end of the valve member 217 in addition to the force of the spring 226.

In the embodiments of Figs. 3 and 4, as illustrated in Fig. 12, pressure fluid passes from the conduit 274 through the conduit 242 to the brake apply servo of the brake 123 (or the brake 132 of Fig. 4) in order to apply direct two-way braking of the sun gear 55. It will be noted that in first and second speed ratios, the applying of either the brake 123 or the brake 132 merely adds to the two-way braking force already provided for the sun gear 55 through the cooperation of the two oppositely acting one-way engaging devices 25 and 26 which are effective through engagement of the friction brakes 21 and 22.

Thus, with the selector valve 143 in the first speed condition, the brakes 21, 22 and 23 are engaged to condition the transmission mechanism for drive in low speed forward ratio as previously described. Engagement of the sun gear locking brake 123 provides additional braking force for the sun gear 55 but does not otherwise contribute to the drive. Because of the energization of the throttle valve 149, the spring 304 of the governor 148 is fully compressed so that the governor valve member 277 is held in its extreme right-hand position to prevent any upshift.

When the vehicle accelerator 306 is depressed to open the throttle butterfly valve 308 to cause the vehicle to move ahead in first speed ratio, the rear pump 115 begins to operate to supply pressure in accordance with the well-known principles of operation of the type of pump disclosed. The rear pump discharges into the conduit 339, and the pressure therein is exerted on the left end of the valve member 321 of the rear pump by-pass valve 150. This valve on such application of pressure moves to the right against the action of the spring 326 to open the port 333 to the supply port 334. The pressure in the conduit 338 connected with the port 333 increases at a predetermined rate in response to increases in vehicle speed due to the provision of the relief orifice 336. It will be readily apparent that the pressure in the conduit 338 will build up as the square of the rate of flow through the relief orifice 336 which in turn varies substantially directly as the speed of the vehicle. For relatively high vehicle speeds, the orifices 319a and 319b (see Fig. 21) perform the same sort of pressure relieving function as the orifice 336 to cause variation of higher pressures in the conduit 338, the pressure in the conduit 338 increasing with the speed of the pump 115 at these higher vehicle speeds also. The orifices 332 function as safety orifices which allow the output fluid under pressure from the rear pump to be relieved to the sump 180 of the transmission at very high output pump pressures which are obtained, for example, when the oil in the transmission is extremely cold and viscous.

The vehicle speed responsive pressure in conduit 338 is conducted to the conduit 273 which is connected to the port 202 of the first speed shift valve 144, but the land 189 now blocks this port. The pressure supplied by the conduit 273 to the port 266 of the 4—3 inhibitor valve tends to move the piston 251 to the right; however, the force from the spring 259 and the fluid pressure from the conduit 272 applied to the right end of the piston 251 through the groove 255, port 264a, conduit 269a and port 269 prevent movement of the piston 251 in this direction.

When the selector valve 143 is moved into the second speed position, the control system and the transmission are conditioned for second speed drive as shown in Fig. 13. With the selector valve in this position, the ports 173, 174, 175, 177 and the inlet port 176 of the selector valve are connected to the pressure fluid as is the case with the selector valve in first speed position. However, the port 172 no longer receives pressure fluid because of the blocking effect of the land 162 and instead is now connected to the relief ports 171. As a result, the pressure is relieved in the conduit 213 to relieve the pressure between the valve members 183 and 184 of the first speed shift valve 144 to allow the valve member 183 to move into its left hand position under the influence of the compression spring 195 to thereby block the ports 203 and 198. The ports 199 and 204 of the first speed shift valve leading to the clutch disapply chamber 108 of the clutch 18 and the brake apply servo 110a of the brake 23, respectively, are now connected to the respective relief ports 200 and 205 to cause disengagement of the brake 23 and to allow engagement of the lock-up clutch 18 by means of the compression spring 104. Thus, direct drive is now provided through the rear transmission unit B.

When the vehicle is moving in second speed ratio, pressure from the rear pump 115 is no longer blocked by the land 189 of the valve member 183 of the first speed shift valve 144, so that pressure fluid from the rear pump passes through the port 202, the groove 188, the port 201, the conduit 209 and the port 197 into the chamber 208 at the right end of the valve member 183 to provide a pressure lock. This pressure lock acts as inhibitor means to prevent ratio changing back to first speed ratio when the vehicle engine would be called upon to operate at too high a speed, since, when the vehicle speed reaches a predetermined value, the pressure exerted by the rear pump 115 becomes of sufficient magnitude when added to the force of the spring 195 in the first speed shift valve to hold the valve member 183 in its left hand position even though the selector valve 143 is moved back to the first speed position to introduce pressure between the valve members 183 and 184. Thus, means are provided to prevent injury to the vehicle engine due to overspeed operation.

All of the other valve pressure connections of the second speed ratio condition are the same as described in connection with the first speed ratio so that both of the planetary gear sets of the transmission unit A are still in reduced drive. Since the rear unit B is in direct drive, the transmission is conditioned for second speed as described in connection with the transmission operation. The throttle valve 149 prevents governor actuated movement of the governor valve 147 to prevent upshifting as is the case in first speed drive.

The transmission and controls are conditioned for third speed forward drive by moving the selector valve 143 into the third speed position as shown in Fig. 14. In this condition, the ports 174, 175 and 177 are still connected with the pressure inlet port 176 from the front pump 43, but the port 173 is now blocked as well as the port 172 which was previously blocked in the second speed position. Thus, the first speed shift valve 144 is in the same position as described in connection with the second speed condition with the vehicle responsive pressure from the rear pump 115 being exerted to lock the valve member 183 in its left hand position to prevent downshifting to first speed in response to movement of the selector lever, should the vehicle speed be too high.

Since the port 173 is now blocked from receiving pressure fluid and is vented to the relief ports 171, the pressure in the throttle valve 149 and in the brake apply servo 84 of the brake 21 is relieved. Thus, the throttle piston member 313 moves to its unactuated left hand position under the influence of the compression spring 316.

Since the pressure from the left end of the multiple disk clutch valve member 217 is now released, the pressure communicated through the port 233 of the multiple disk clutch valve 145 moves the valve member 218, and consequently the valve member 217, toward the left against the compression of the spring 226 until the valve member 218 engages the stop 231. At this point, the valve member 217 is not yet moved completely to the left as shown in Fig. 14, but the movement is sufficient to permit communication between the ports 237, and 236 of the multiple disk clutch valve to admit fluid to the clutch apply chamber 80 of the multiple disk clutch 16 by means of the conduit 243 to cause engagement of this clutch. This complete fluid path is from the port 175 of the selector valve 143 to the conduit 244, the port 237 of the multiple disk clutch valve 145, the groove 221 of the valve member 217, the port 236, and the conduit 243.

In third speed ratio the friction brake 22 and the friction clutch 18 are engaged while the friction brake 23 is disengaged as is the case in second speed ratio, but the friction brake 21 is now disengaged and the multiple disk clutch 16 is engaged to lock up the forward gear set 15. As a result, direct drive is provided through the front gear set 15 and rear gear set 19 while a reduced drive is still provided through the center gear set 17, and the transmission mechanism is conditioned for drive in third speed ratio as described in connection with the operation of the transmission mechanism.

It will be noted that manual selection of third speed ratio provides this speed ratio regardless of the operation of the governor 148 and the governor valve 147 because of the movement of the clutch valve member 218 to a position against the stop 231 which moves the valve member 217 sufficiently against the spring 226 to connect the ports 236 and 237. However, ordinarily when the control system is manually conditioned for third speed ratio, a vehicle speed is attained that is sufficient to provide governor energized movement of the multiple disk clutch valve member 217 to its extreme left hand position as shown in Fig. 14. Increased vehicle speed causes increased centrifugal force in the flyballs 300 of the governor 148 which tends to move the governor control member 303 toward the left against the compression of the governor spring 304, and this results in movement of the governor valve member 277 toward the left. Increased depression of the accelerator pedal 306 causes movement of the governor member 302 toward the right through the linkage 307, the lug 310 and the accelerator controlled member 305 to increase the compressive force of the governor spring 304 to impede movement of the governor member 303 toward the left under the influence of the flyball 300. Thus, the movement of the governor valve member 277 is responsive to both vehicle speed and engine torque called for by the position of the accelerator pedal. As soon as the combination of vehicle speed and accelerator pedal depression influence permits, the governor member 303 moves sufficiently to the left to move the governor valve member 277 to a position for permitting communication between the governor inlet 287 and port 286 which communicates with the port 234 of the multiple disk clutch valve 145 by means of the conduit 289. Thus, pressure fluid is imposed against the right end of the clutch valve member 217 to move the valve member to its extreme left hand position against the compression of the spring 226 as seen in Fig. 14. With the valve member in this position, the ports 236 and 237 communicate fully while communication between the port 240 and the valve grooves 232 is now cut off. The various engaging means are still actuated in the same manner as previously described even though the fluid pressure from the governor valve 147 has moved the valve member 217 of the multiple disk clutch valve 145 an additional increment.

Even if the vehicle speed should subsequently decrease to cause the governor valve member 277 to close the port 236, the control system will remain in the third speed condition as long as the selector valve 143 is positioned as shown in Fig. 14, since the fluid pressure holding the clutch valve member 218 in its left hand position against the stop 231 prevents movement of the valve member 217 to its extreme right hand position.

Governor actuated upshifting to fourth speed ratio when the selector valve 143 is in the third speed position is prevented by the 4–3 inhibitor valve 146 at ordinary vehicle speeds. Pressure fluid is imposed against the left end of the inhibitor valve member 253 through the selector valve port 174, the conduit 272, the inhibitor valve port 265, the groove 255 of the valve member 251, and the internal port 270. With the valve member 253 in its right hand position as shown in Fig. 14, the valve extension 271 prevents movement of the governor valve member 277 to the left beyond the position shown in Fig. 14 so that the governor port 285 remains closed to prevent actuation of the direct drive clutch 14.

It will be noted that the pressure from the rear pump 115, which increases with vehicle speed, is impressed through the conduits 338 and 273 and the port 266 on the left end of the valve member 251, and the pressure from the rear pump tends to move the valve member 251 to the right against the action of the compression spring 259 to close the port 265 by the land 256 and open the port 270 to the exhaust port 264. This, however, is prevented by the fluid pressure from the conduit 272 impressed on the right end of valve member 251 through the groove 255, port 264a, conduit 269a and port 269, and the transmission remains in its third speed drive illustrated in Fig. 14.

If the sun gear locking brake, such as the brake 123 of Fig. 3 or the brake 132 of Fig. 4, is not engaged for third speed ratio, the drive, when coasting with the accelerator released, will be in fourth gear due to the engagement of the one-way unit 25 and the overrunning of the one-way unit 26. However, when the sun gear locking brake 123 is provided as shown in Fig. 10, this brake is engaged with the selector valve 143 in the third speed position by means of the pressure fluid in the conduit 242, from the 4–3 inhibitor valve 146, leading to the brake apply chamber for the brake 123. When this brake is engaged, the sun gear 55 is prevented from rotation in either direction so that the vehicle engine may be used as a brake for the vehicle in third speed ratio.

When the selector valve 143 is in the "D" or drive position as shown in Fig. 15, the control system is conditioned for automatic ratio changing between second, third and fourth speeds forward in accordance with vehicle speed and accelerator depression.

The control system, as pictured in Fig. 15, is conditioned for operation in fourth speed forward or direct drive. In this condition, the selector valve port 174 now communicates with the relief ports 171 so that the pressure in the conduits 272, 274 and 242 and the pressure in the 4—3 inhibitor valve 146 has been relieved. The vehicle is moving at a sufficiently high speed so that the governor valve 277 connects the ports 287, 296, 297, 285 and 286. Fluid pressure is thus supplied to the conduit 288 in addition to the conduit 289 which was supplied in third speed drive. The fluid pressure introduced through the port 234 of the clutch valve 145 from the conduit 289 has moved the valve member 218 back to its extreme right hand position as shown. In the inhibitor valve 146, the spring 263 has moved the piston 253 to its extreme left hand position so that it no longer inhibits movement of the governor valve member 277. Fluid under pressure is transmitted from the governor port 285 through the conduit 288 to the clutch apply chamber 41 of the direct drive friction clutch 14, to cause engagement of this clutch and to directly connect the drive shaft 10 with the intermediate shaft 42. Since the position of the first speed shift valve 144 is unchanged, direct drive is still provided through the rear unit B, so that the overall drive ratio is a direct drive exclusive of the torque converter 13. It will be noted that the forward friction brake 22 remains engaged but is ineffective, since the one-way engaging means 26 unlocks to allow forward rotation of the sun gear 55. The sun gear locking brake 123, if one is provided, is now disengaged since the fluid pressure in the conduit 242 was relieved when the selector valve port 174 was put into communication with the relief ports 171.

If the selector valve 143 remains positioned in its "Drive" position and the vehicle speed decreases sufficiently to cause the governor valve member 277 to close the governor port 285, the transmission is downshifted to third speed ratio due to the consequent release of the direct drive clutch 14. However, since the selector valve port 174 is in communication with the relief ports 171, no pressure can be communicated to the sun gear brake 123, and the third speed ratio releases when the vehicle tends to drive the engine. Under the latter conditions, the one-way unit 25 engages, and the gearing 15 and 17 is locked up providing a one to one drive power train between the output shaft 11 and the torque converter 13.

The piston 292 of the governor valve 147 provides means for preventing a governor downshift from fourth speed ratio to third speed ratio until a lower vehicle speed is reached than the speed at which an automatic upshift is effected. When the supply port 287 communicates with the port 285, it also communicates with the passage 297, so that fluid pressure is imposed against the right end of the needle piston 292 to hold the piston against the governor controlled member 295. Thus, once fourth speed ratio has been achieved by the governor, the spring 304 in moving the piston 277 to its third speed position must overcome the force due to the piston 292 which was not effective when the governor was operative to move the valve 277 to its fourth speed position from its third speed position.

With the selector valve 143 still in its "D" or automatic drive position, a subsequent decrease in vehicle speed of sufficient magnitude will cause the governor valve member 277 to move further toward the right to cut off communication between the supply port 287 and the governor port 286 to release the pressure against the right end of the clutch valve member 217 to allow the spring 226 to move the valve member to its extreme right hand position. This causes the valve land 222 to block the clutch valve port 237 and to open the clutch valve port 236 to the relief ports 235. This releases the pressure in the clutch apply chamber 80 of the multiple disk clutch 16 to release this clutch and to cause the transmission to be downshifted to second speed ratio. It will be noted that this is a freewheeling drive with the selector valve in automatic drive position with the ports 173 and 174 of this valve being opened to the relief ports 171, since neither the brake 21 nor the brake 123 can be engaged with the ports 173 and 174 opened. Furthermore, the throttle valve 149 is not actuated as was the case when the selector valve 143 was moved to the second speed position as shown in Fig. 13.

It will be noted that this automatic downshift from third speed ratio to second speed ratio is effected at a lower vehicle speed than the upshift between these ratios because of the action of the needle piston 291. Before the governor control member 295 has moved to the right sufficiently to cause the governor valve member 277 to cut off communication between the ports 287 and 286, the member 295 comes into contact with the left end of the piston 291. Since the right end of the piston 291 is exposed to the pressure from the inlet port 287 through the passage 296, the additional force of this needle piston must be overcome by the governor spring 304 before the governor valve 277 can be moved far enough to the right to cause the downshift to second speed ratio. This downshift inhibiting action of the needle piston 291 is much the same as the downshift inhibiting action of the needle piston 292.

When the selector valve 143 is in the automatic drive or "D" position, it will be seen that no matter how low the vehicle speed becomes, the system will never downshift the transmission to first speed ratio, since the first speed shift valve member 183 remains in its extreme left hand position, as the selector valve port 172 connected to the valve member 183 is vented to the sump 180 in the "D" position of the selector valve piston 157.

It will be apparent that upshifting takes place from second speed ratio, as illustrated in Fig. 13, to third speed ratio, as illustrated in Fig. 14, and subsequently from third speed ratio to fourth speed ratio, as illustrated in Fig. 15, under the combined action of the accelerator and governor, similar to the manner in which the accelerator and governor produced the downshifts. Increased vehicle and governor speed will cause the valve 147 to move from its second speed position to its third speed position and thence to its fourth speed position. The influence of the accelerator in upshifting at closed throttle is adjustably limited by the idle stop 305a that limits the distance the end 302 of the governor can move to the left. The needle piston 291 in upshifting has the additional function of causing a quick movement of the valve piston 277 and the governor control member 295 into their third speed positions whenever the ports 286 and 296 are cracked or slightly opened to the port 287. The needle piston 292 has a similar action to moving the valve 277 into its fourth speed position whenever the ports 285 and 297 are cracked or slightly opened to the port 287. The needle pistons 291 and 292 thus assure a full completion of the third and fourth speed power trains as soon as the valve 277 has moved far enough.

The valve member 251 of the 4—3 inhibitor valve 146 acts to prevent a manual downshift to third speed ratio from fourth speed ratio by shifting the manual valve 143 from its "D" to its "3" position when the vehicle is traveling at a predetermined fairly high speed. When the vehicle is traveling at this high speed, the output pressure from the pump 115 becomes sufficient to move the 4—3 inhibitor valve piston 251 to its right hand position against the compression of the spring 259. With the valve piston in this position, the land 256 blocks the port 265 so that no pressure can be communicated to the left end of the piston 253, and the piston 253 will stay at its extreme left hand position regardless of movement of the manual selector valve 143. If this predetermined high vehicle speed has not yet been reached, actuation of the selector valve 143 to the third speed position causes pressure fluid to move the inhibitor valve member 253 to the right to move the governor control member 295 and the governor valve member 277 to the right to cut off communication between the port 285 and the inlet port 287 so that the direct drive clutch 14 is disengaged. At the same time, the valve member 218 of the clutch valve 145 is moved to the left against the stop 231 to move the valve member 217 sufficiently to open communication between the ports 236 and 237 to cause engagement of the multiple disk clutch 16.

The throttle valve 149 cooperating with the mechanical governor 148 is similar in action to the 4—3 inhibitor valve 146 cooperating with the pump 115 in preventing a downshift above a certain vehicle speed, the downshift in this case, however, being from third speed ratio to second speed ratio. As is apparent from the foregoing description of the operation of the transmission control mechanism and from a comparison of Figs. 13 and 14, when the selector valve 143 is moved from its third speed position to its second speed position, fluid under pressure is admitted to the throttle valve 149 tending to move the governor valve 277 from its Fig. 14 third speed position to its Fig. 13 second speed position. However, if the speed of the vehicle and, therefore, the speed of the governor 148 are sufficiently high, the balls 300 of the governor will be out sufficiently far so that even though the piston 313 of the throttle valve 149 is moved to the limit of its movement to the right as seen in the figures, nevertheless, the right end 303 of the governor 148 will not be move sufficiently far to the right to move the governor valve 277 into its Fig. 13 second speed position, and the governor valve piston 277 will remain in its third speed position. With the governor valve 277 remaining in its Fig. 14 position, fluid pressure will continue to be in conduit 289 and impressed on the valve piston 217 to hold the valve piston 217 in its Fig. 14 position, so that the fluid pressure passing through the port 240 in the multiple disk clutch valve 145 with the selector valve 143 in its second speed position will be blocked by the land 224, and fluid pressure thus is not supplied to the conduit 247 and to the lockup brake 21. Fluid pressure continues to be supplied through the groove 221 of the multiple disk clutch valve 145 through the conduit 243 to the lockup clutch 16, thus holding the transmission in third speed ratio regardless of movement of the selector valve 143 from its third speed position to its second speed position.

When the selector valve 143 is in the "R" position as shown in Fig. 16, the control system and the transmission are conditioned for reverse drive ratio. The selector valve inlet port 176, which communicates with the outlet of the front pump 43 by means of the conduit 401, is in communication with the selector valve ports 177 and 178 by means of the groove 159. Pressure fluid is conducted from the port 178 through the conduit 214 to the port 207 of the first speed shift valve 144 to act against the left end of the valve member 184 to urge this valve member and the valve member 183 to their extreme right hand positions against the compression of the valve spring 195. This movement of the first speed shift valve opens communication between the ports 203 and 204 through the valve groove 190 so that pressure fluid passes through the conduit 212 to the brake servo 110a for engaging this brake. At the same time, communication is opened between the shift valve ports 198 and 199 through the valve groove 186 so that pressure fluid is conducted through the conduit 211 to the clutch disapply chamber 108 for disengaging the clutch 18 against the compression of the spring 104. As a result, reduced drive is provided through the rear transmission unit B.

Since the vehicle is standing still when the transmission is conditioned for reverse drive and since the driving of the rear pump 115 in the reverse direction, when the vehicle begins to move in reverse, does not provide pressure fluid in the conduit 339, the rear pump bypass valve spring 326 moves the valve member 321 to its extreme left hand position as shown in Fig. 16 to open communication between bypass valve ports 331 and 340 through the valve groove 323. Pressure fluid is then conducted from the conduit 214 through the conduit 337, through the valve groove 323 and through the conduit 342, which, in turn conducts pressure fluid to the brake apply chamber 71 of the cone friction brake 20 to cause engagement of this brake.

With the friction brakes 20 and 23 engaged and the other friction engaging means of the transmission disengaged, the transmission mechanism is conditioned for reverse drive as previously described in connection with the operation of the transmission mechanism.

With the rear pump by-pass valve 150 in the position shown in Fig. 16, communication is afforded between the by-pass valve ports 331 and 341. The conduit 341 is connected with the port 423 in the valve 408 and applies pressure in the cavity 413 to act against the right end of the plunger 415. The left end of the plunger 415, under the action of this fluid pressure, moves against the valve piston 418 and tends to counteract the fluid pressure acting on the left end of the piston 418. The left end of the piston 418 is connected with the pump outlet passage 403, as has been previously described. Since the plunger 415 is effective on the valve piston 418, it requires a greater force applied to the left end of the valve piston 418 to move it from its illustrated position, in which the fluid pressure is connected to the port 426 and thereby to the cavity 405 into its position in which the ports 420 are in communication with the port 425 connected with the cavity 407. Application of pressure within the cavity 407, as has been previously described, causes the pump to reduce its output and thereby tends to reduce the output pressure in the passage 403 and in the conduit 401, and the pressure in the conduit 401 is thus stabilized at a higher pressure, such as 160 lbs. per square inch, as compared with the pressure supplied the conduit 401 for the forward drives. This increased pressure is effective for maintaining the brake 20 engaged, which requires a greater force of engagement for completing the reverse drive than is required by the other friction engaging clutches and bands for the forward drives.

The torque converter valve 151 is arranged to prevent an increase in pressure in and flow through the torque converter 13 due to the increased pressure level of the system in reverse drive. The conduit 363, which is connected to the pressurized conduit 342, conducts pressure fluid to the port 362 of the torque converter valve, and the pressure acting against the left end of the piston 354 moves the piston toward the right to engage the right end of the extension 357 with the valve member 345 at the bottom of the cavity 350 in the valve member. The pressure in the conduit 363 acting on the left end of the piston 354 acts to cancel out the increased fluid pressure in the conduit 359 and impressed on the right hand of the valve member 345 so that the valve member 345 regulates as before to provide a converter pressure in the conduit 361 having substantially the same value as for the forward drives. The regulating action by the valve 345 is due to the pressure from the conduit 361 passing through the port 349 into the interior of the valve piston 345, as has been previously described.

With the system conditioned for reverse drive, fluid pressure is applied to the transfer case servo 153 through the conduit 384. The application of pressure to the piston 380 of the servo 153 acts through the piston rod 381 and against the action of the spring 382 to move the clutch sleeve 451 (see Fig. 7) from its forward drive position in which the clutch teeth 453 engage with the clutch teeth 454, into its reverse drive position in which the clutch teeth 453 engage instead with the clutch teeth 456. Therefore, if the transfer case assembly is used in connection with the transmission, the transfer case is conditioned automatically for driving the front wheels of the vehicle in reverse drive when the remainder of the system is conditioned for reverse drive.

It should be noted that the rear pump bypass valve 150 has the function of maintaining the pressure in the fluid supply conduit 401 and the pressure in the torque converter 13 at their values for forward speed drives and of maintaining the reverse brake 20 disengaged while there is any forward movement of the vehicle. The pump 115 provides a fluid pressure output into the conduit 339 with forward movement of the vehicle, and the pressure in the conduit 339 holds the valve piston 321 to the right against the action of its spring 326 so that the land 324 blocks the port 331. Thus, even though the selector valve 143 is moved into its "R" position, supplying fluid pressure through the conduit 337 to the port 331 of the rear pump bypass valve 150, nevertheless, due to the position of the valve 150, the line pressure in the conduit 401 and the pressure within the converter 13 are not raised and the reverse brake 20 remains disengaged, until the vehicle stops its forward motion and the rear pump 115 ceases producing pressure within its outlet conduit 339.

The principal purpose of the pump 115 is to act as a governor on the 4—3 inhibitor valve 146, the first speed shift valve 144 and the rear pump bypass valve 150, the valves 144 and 150 respectively inhibiting the second to first shift and the shift to reverse respectively; however, when the vehicle is inoperative, the pump 115, in this case, applies fluid under pressure to the conduit 401 for providing a fluid pressure for engaging the friction bands and clutches of the transmission, so that the vehicle engine may be started by towing or pushing the vehicle, the pump 115 being operated by the rotation of the intermediate shaft 42 through the rotation of the rear wheel of the vehicle when towed or pushed. The fluid under pressure in this case causes the ball 398 to move off its seat 399 against the action of the spring 400 and open the outlet of the pump 115 to the conduits 396 and 401 (see Figure 11).

The restriction 335 (Figure 11), in the rear pump bypass valve 150 is principally for the purpose of preventing a residual rear pump pressure in the conduit 339 when the vehicle is stationary, so that the valve piston 321 of the rear pump by-pass valve will move all the way over to its extreme left hand position under the action of the spring 326 in neutral condition of the vehicle. The piston 321 is thus in position for increasing the pressure in the conduit 396 and connected conduits for reverse drive, as has been described. For pushing or towing the vehicle, it will be noted that a drive is automatically completed through the rear unit B without any fluid pressure being required, the multiple plate clutch 18 being engaged under the influence of the springs 104.

The restriction 198a (Figure 17), adjacent the port 198 in the first speed shift valve 144 is utilized to time the release of the clutch 18 with respect to the application of the brake 23 on the rear unit B. On a downshift from second to first speed ratios, the vehicle engine must double in speed, or substantially so, depending on the exact ratios provided by the rear transmission unit B, so that the clutch 18 is disengaged before the brake band 110 engages. The restriction 198a slows the application of fluid pressure to the piston 105 for the clutch 18 for this purpose and allows the engine to speed up before an actual completion of the low speed power train by the engagement of the brake 23 occurs. The orifice 205a adjacent the port 205 (see Figure 17), in the first speed shift valve 144 is provided for the purpose of slowing the disengagement of the friction band 110 in a shift from first to second speed ratios. The band 110 would otherwise release fast, causing the driving through the transmission to be completely broken on an upshift from first to second speed ratio causing the vehicle engine to race.

From the preceding detailed description, it will be readily seen that the present invention provides an improved transmission and control system for achieving automatic ratio changing between the three highest forward speed ratios and also providing for manual shifting between these three forward speed ratios and another forward ratio and a reverse speed ratio. Freewheeling is prevented in all of the manually selected forward speed drives so that the vehicle engine is available as a brake. The three lowest forward speeds and reverse speed are through the hydraulic torque converter and the gearing while the highest forward speed is a direct drive exclusive of the torque converter, so that the inherent inefficiencies of the torque converter do not enter into the efficiency as a whole of the transmission in its highest forward speed drive. The control system is substantially simplified over other control systems for achieving two automatic ratio changes plus various manual ratio changes. The 4—3 inhibitor valve, under the control of the rear pump 115, functions to prevent a downshift from fourth to third speed ratios above certain vehicle speeds. The throttle valve 149 acting on the governor 148 prevents an upshift out of second speed drive when the selector 143 is in its second speed position and also cooperates with the governor as a third to second speed inhibitor to prevent a downshift from third speed ratio to second speed ratio above a predetermined vehicle speed with movement of the manual selector valve 143 from its third speed to its second speed position. The rear pump by-pass valve 150 advantageously cooperates with the variable displacement pump 43 for regulating the pressures to a higher value in the system for reverse drive as compared with forward drives, and the reverse pressure increase valve 408 per se functions in connection with the pump 43 for regulating both the maximum pressures for the forward drive and for the reverse drive. The servo motor 153 advantageously functions to condition the transfer case for a drive of the front wheels of the vehicle for reverse drive through the transmission.

We wish it to be understood that our invention is not to be limited to the specific constructions and arrangements shown and described, except only insofar as the claims may be so limited, as it will be understood to those skilled in the art that changes may be made without departing from the principles of the invention.

We claim:

1. In a transmission, the combination of a drive shaft, a driven shaft, means for providing low, second, third, and high speeds forward drives between said shafts, a selector member having first, second, third and drive positions, means for rendering said first, second and third drives completed under the control of said selector member when the selector member is respectively positioned in its low, second and third positions, and speed responsive means rendered operative by said selector member when it is positioned in its drive position for automatically shifting the transmission from its second to its third and finally to its high speed drives as the speed of said driven shaft increases.

2. In a transmission, the combination of a drive shaft, a driven shaft, means for providing a low speed power train between said shafts, means for providing a high speed power train between said shafts, means for shifting from said low speed power train to said high speed power train and vice versa and including a valve having a low speed position and a high speed position, a governor having an output member connected to said valve for moving the valve, means for moving said valve and said member from their high speed positions to their low speed positions and including a piston adapted to have fluid pressure applied thereto, a valve for selectively applying fluid pressure to said piston, and means providing a fluid pressure that varies in accordance with the speed of said driven shaft on to said last named valve for preventing the application of fluid pressure to said piston above a predetermined speed of said driven shaft.

3. In a transmission, the combination of a drive shaft, a driven shaft, means for providing a low speed power train between said shafts, means for providing an intermediate speed power train between said shafts, means for providing a high speed power train between said shafts, means for changing the transmission between the various speed ratios and including a valve having a low speed position and movable into an intermediate position and movable farther into a high speed position, a speed responsive governor, means for connecting said governor and said valve so that the governor tends to move the valve from its low to its intermediate to its high speed position with increases in governor speed, a fluid pressure actuated piston for moving said valve from its high to its intermediate speed position against the action of said governor, and a second fluid pressure actuated piston for moving said valve from its intermediate to its low speed position against the action of said governor.

4. In a transmission, the combination of a drive shaft, a driven shaft, means for providing a power train between said shafts including fluid pressure engaged friction engaging means requiring a certain fluid pressure to engage it, means for providing a second power train between said shafts including friction engaging means requiring a higher fluid pressure to engage it, fluid pressure controlled pressure increasing means for providing said higher fluid pressure when fluid pressure is applied thereto, a valve for applying and disapplying fluid pressure to said increasing means, a pump driven by said driven shaft and means for connecting said pump to apply pressure therefrom on a land of said valve to move it in response to pressure from said pump and thereby control the action of said pressure increasing means.

5. In transmission mechanism, the combination of a drive shaft, a driven shaft, means for providing a power train between said shafts including fluid pressure engaged friction engaging means requiring a certain fluid pressure to engage it, means for providing a second power train between said shafts including fluid pressure engaged friction engaging means requiring a higher fluid pressure to engage it, a variable displacement pump connectible with said friction engaging means and supplying a certain relatively low fluid pressure and when having a fluid pressure applied thereto supplying a higher fluid pressure, a valve for supplying fluid pressure to said pump for providing said increased pressure, and a pump driven by said driven shaft and having its output impressed on said valve for causing the valve to move into position for applying fluid pressure from said first named pump when there is a fluid pressure output from said driven shaft pump which is rotating in the forward direction.

6. In a transmission mechanism, the combination of a drive shaft, a driven shaft, an intermediate shaft, a first transmission unit between said drive and intermediate shafts for driving the intermediate shaft at three speeds in forward drive, a second transmission unit between said intermediate shaft and said driven shaft for driving the driven shaft at a low and a high forward drive ratio with respect to the intermediate shaft, selector means for simultaneously conditioning the first transmission unit for a low speed forward drive between said drive and intermediate shafts and said second transmission unit for a low speed forward drive between said intermediate and said driven shafts, and selector means for conditioning said first unit for a reverse drive between said drive and intermediate shafts and said second transmission unit for a low speed forward drive between said intermediate and driven shafts.

7. In a transmission, the combination of a drive shaft, a driven shaft, means for providing a low speed drive between said shafts, means for providing a high speed drive between said shafts, means for changing from said low speed drive to said high speed drive including a fly ball type of governor having outwardly movable flyballs connected between first and second governor parts movable toward and away from each other and a control member having a low speed position and a high speed position and connected with said second part to be moved by the latter part from its low speed position to its high speed position as said flyballs move outwardly under centrifugal force, and means for preventing a movement of said control member from its low speed position to its high speed position below a predetermined speed of said governor and including a fluid pressure operated piston effective on said first governor part tending to move said first governor part in the direction of said second governor part when fluid pressure is applied to said piston.

8. In a transmission for an automotive vehicle, the combination of a drive shaft, a driven shaft, means for providing a low speed drive between said shafts, means for providing a high speed drive between said shafts, means for changing from said low speed drive to said high speed drive including a fly ball type of governor having outwardly movable fly balls connected between first and second parts movable toward and away from each other and a control member having a low speed position and a high speed position and connected with said second part to be moved by the latter part from its low speed position to its high speed position as said fly balls move outwardly under centrifugal force, an accelerator for the vehicle, means connected with said accelerator for acting on said first part tending to move said first part toward said second part and thereby tending to move said control member from its high speed position to its low speed position as the accelerator is moved toward its open throttle position, a manual selector member for controlling the transmission, and means connected with said manual selector member and operative to move said first governor part toward said second governor part for preventing under manual control a movement of said control member from its low speed position to its high speed position below a predetermined speed of said governor.

9. In a transmission for an automotive vehicle, the combination of a drive shaft, a driven shaft, means for providing a low speed drive between said shafts, means for providing a high speed drive between said shafts, means for changing from said low speed drive to said high speed drive including a fly ball type of governor having outwardly movable fly balls pivotally connected between first and second parts movable toward and away from each other and a control valve having a low speed position and a high speed position and connected with said second part to be moved by the latter part from its low speed position to its high speed position as said second part is moved by said fly balls moving outwardly under centrifugal force, spring means tending to hold said two governor parts apart, an accelerator for the vehicle and operatively connected with said first part tending to move said first part and thereby said second part and said valve through the governor from the high speed position to the low speed position of the valve as the accelerator is moved toward its open throttle position, a manually operable selector valve for controlling the transmission, and a hydraulic piston connected with said selector valve and rendered operative thereby to move said first governor part toward said second governor part for preventing under manual control a movement of said first named valve from its low speed position to its high speed position below a predetermined speed of said governor.

References Cited in the file of this patent

UNITED STATES PATENTS

| | | |
|---|---|---|
| 1,997,682 | Emery | Apr. 16, 1935 |
| 2,064,421 | Erskine | Dec. 15, 1936 |
| 2,167,873 | Burtnett | Aug. 1, 1939 |
| 2,170,869 | Neracher | Aug. 29, 1939 |
| 2,195,605 | Thompson | Apr. 2, 1940 |
| 2,329,724 | Maurer | Sept. 21, 1943 |
| 2,354,300 | Bock | July 25, 1944 |
| 2,548,208 | Evernden | Apr. 10, 1951 |
| 2,555,702 | Railton | June 5, 1951 |
| 2,576,336 | Farkas | Nov. 27, 1951 |
| 2,595,969 | McFarland | May 6, 1952 |
| 2,604,197 | Livermore | July 22, 1952 |
| 2,640,373 | Jandasek | June 2, 1953 |
| 2,644,559 | Randol | July 7, 1953 |
| 2,645,135 | Frank | July 14, 1953 |
| 2,645,137 | Roche | July 14, 1953 |

(Other references on following page)

UNITED STATES PATENTS

| | | |
|---|---|---|
| 2,658,408 | Miller | Nov. 10, 1953 |
| 2,660,071 | Winther et al. | Nov. 24, 1953 |
| 2,763,162 | Herndon | Sept. 18, 1956 |

FOREIGN PATENTS

| | | |
|---|---|---|
| 509,389 | Germany | Oct. 10, 1930 |
| 536,503 | Great Britain | May 16, 1941 |
| 653,230 | Great Britain | May 9, 1951 |

OTHER REFERENCES

Automotive Industries, pages 32, 33 and 72, September 1, 1950.